United States Patent [19]
Webb et al.

[11] Patent Number: 5,519,791
[45] Date of Patent: May 21, 1996

[54] BLOCK PARALLEL ERROR DIFFUSION METHOD AND APPARATUS

[75] Inventors: Michael Webb, Lane Cove; David R. Brown, East Roseville; William C. Naylor, Jr., Mount Kuring-gai, all of Australia

[73] Assignee: Canon, Inc., Tokyo, Japan

[21] Appl. No.: 177,303

[22] Filed: Jan. 4, 1994

[30] Foreign Application Priority Data

Jan. 11, 1993 [AU] Australia ................................. PL6761

[51] Int. Cl.⁶ ..................................................... G06K 9/36
[52] U.S. Cl. ........................... 382/252; 358/465; 382/234; 382/304
[58] Field of Search ................... 382/55, 54, 51, 382/52, 53, 252, 270–273, 304, 234; 358/465, 466, 455–458

[56] References Cited

U.S. PATENT DOCUMENTS

| | | | |
|---|---|---|---|
| 4,733,230 | 3/1988 | Kurihara et al. | 340/728 |
| 4,890,167 | 12/1989 | Nakazato et al. | 358/443 |
| 5,070,413 | 12/1991 | Sullivan et al. | 358/456 |
| 5,208,871 | 5/1993 | Eschbach | 382/50 |
| 5,271,070 | 12/1993 | Truong et al. | 382/50 |
| 5,307,426 | 4/1994 | Kanno et al. | 382/54 |
| 5,325,448 | 6/1994 | Katayama et al. | 382/50 |
| 5,351,312 | 9/1994 | Sato et al. | 382/50 |
| 5,369,507 | 11/1994 | Tanaka et al. | 382/50 |
| 5,388,167 | 2/1995 | Koga et al. | 382/50 |

FOREIGN PATENT DOCUMENTS 0395404   10/1990   European Pat. Off. .

OTHER PUBLICATIONS

P. Heckbert, "Color Image Quantization for Frame Buffer Display", Computer Graphics, vol. 16, No. 3, pp. 297–307 (Jul. 1982).

R. Ulichney, "Digital Half Toning", MIT Press, pp. 341, 342 (1987).

G. W. Braudaway, "Procedure for Optimum Choice of a Small Number of Colors From a Large Color Palette for Color Imaging", IBM Technical Disclosure Bullentin, vol. 29, No. 3, pp. 1329–1334 (Aug. 1986).

*Primary Examiner*—Joseph Mancuso
*Attorney, Agent, or Firm*—Fitzpatrick, Cella, Harper & Scinto

[57] ABSTRACT

In order to display a continuous tone colour image on a discrete colour level display, methods of halftoning must be used. The high display rate of colour output devices means that serial methods of real time halftoning are difficult to use. A method and apparatus is disclosed for reducing the speed with which a halftoning method must be performed by performing the halftoning of an output image by simultaneously dividing the input image into a number of areas and simultaneously halftoning the areas individually making special provisions for pixels located in the boarder regions of a given area.

12 Claims, 19 Drawing Sheets

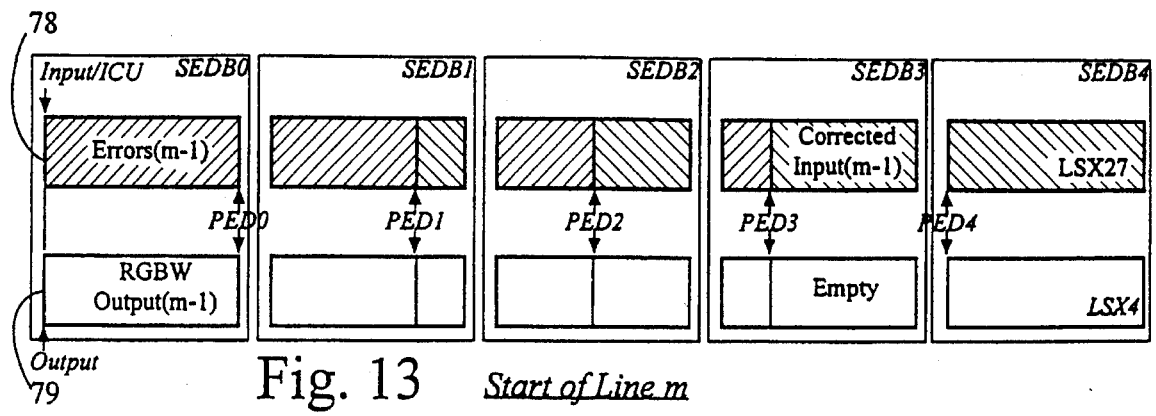
Fig. 13   *Start of Line m*
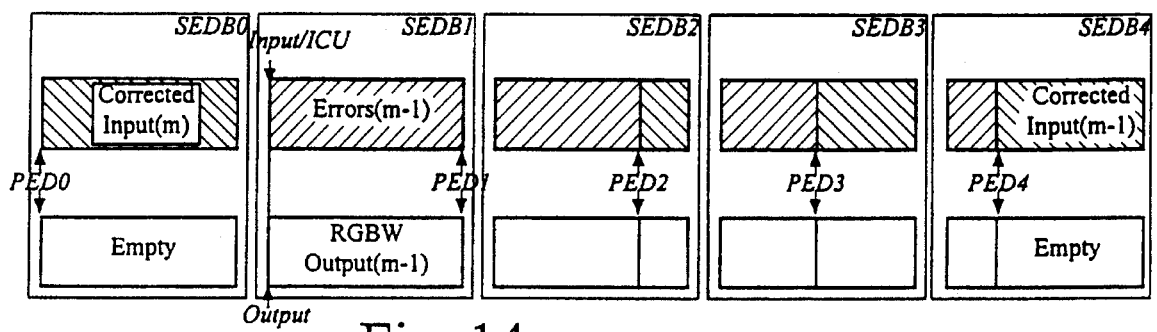
Fig. 14   *20% Through Line m*
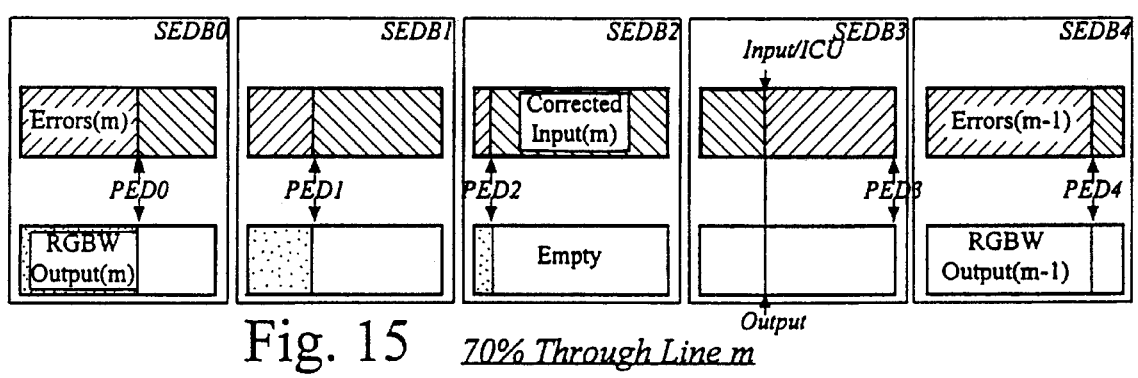
Fig. 15   *70% Through Line m*
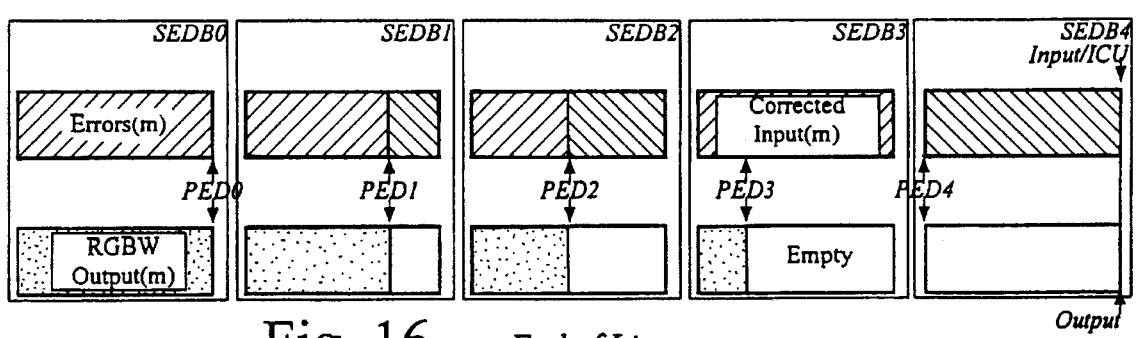
Fig. 16   *End of Line m*

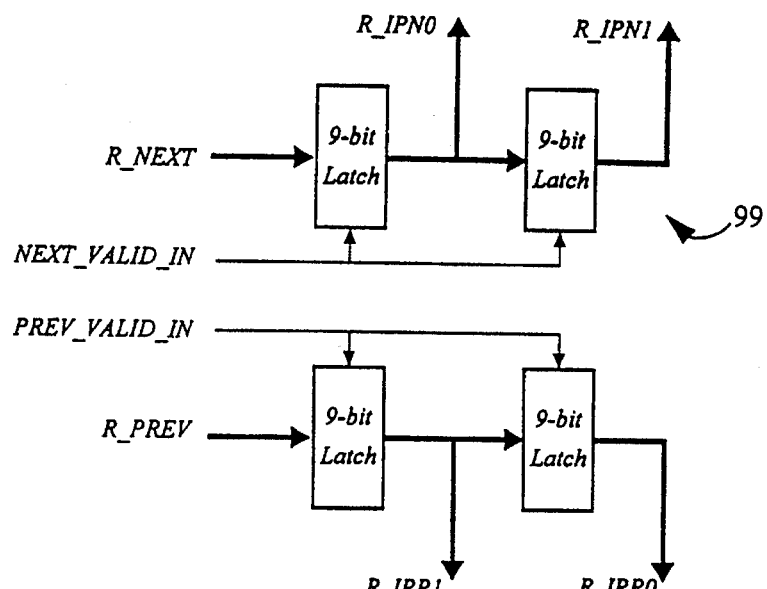
Fig. 20
*(Only Red Channel shown; Blue and Green channels are identical)*
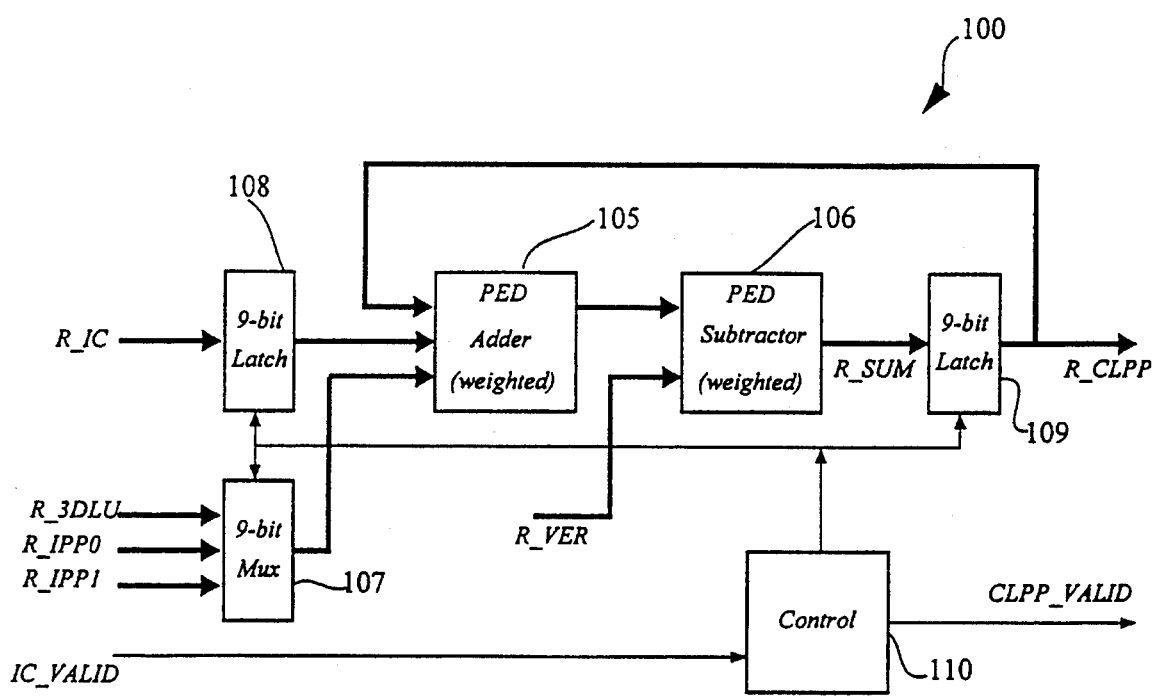
Fig. 21   *(Only Red Channel datapaths shown; Blue and Green channels are identical)*

Only Red Channel datapaths shown; Blue and Green channels are identical

BLOCK PARALLEL ERROR DIFFUSION METHOD AND APPARATUS

FIELD OF INVENTION

The present invention relates to colour display apparatus such as colour computer displays and colour printers, and, in particular, the display of colour images on a raster colour display apparatus.

DESCRIPTION OF THE BACKGROUND OF THE INVENTION

The prior art will now be described with reference to the following drawings in which:

FIG. 1 is a view of a conventional single pixel of a CRT type display;

FIG. 2 is a representation of a unit colour cube; and

FIG. 3 is a diagrammatic representation of the Floyd and Steinberg error diffusion process.

Colour raster graphic display devices are well known in the art. The display of colour images in these devices is normally achieved by means of a pixel map. A pixel map normally consists of individual pixels. Each pixel in turn consists of a collection of bits which represent the colour value of that pixel on the display device. The number of different possible bits in this collection is related to the number of different colours which may be displayed by the display device and hence the resolution with which the device can display a given picture. Common colour systems store 8 or 24 bits per pixel, although other variations are possible.

A display device displays the corresponding colour value of the pixel, often to a high resolution. Common screen displays are capable of displaying a number of different pixels in the range of 1280 by 1024 pixels with each pixel capable of displaying up to $2^{24}$ different colour values.

Colours are often displayed on a computer display according to a particular model. The red, green, blue (RGB) colour model is one that is in common use with Cathode Ray Tubes (CRT) and colour raster display devices. Other colour display models include cyan, magenta, yellow (CMY) often used in colour-printing devices. One example of an RGB model is in the NTSC picture display standard in cogon use with computer displays. In this standard, each pixel element is divided into 3 separate sub groupings. These separate subgroupings represent the Red, Green and Blue portion of a given pixel element respectively.

Referring now to FIG. 1, the viewing surface of a colour CRT often consists of closely spaced, pixels 1. Each pixel is made up of a red (R), green(G) and blue (B) phosphor dot or pixel element. These dots are so small that light emanating from the individual dots is perceived by the viewer as a mixture of the corresponding three colours. A wide range of different colours can thus be produced by a given pixel by variation of the strength with which each phosphor dot is excited. A conversion arrangement (not shown) is normally provided so that the strength of each phosphor dot's excitation has some proportionality to the value of each of the above mentioned pixel element subgrouping. By way of example, a 24 bits per pixel colour display system can be divided into 8 bits for each of the three colours red, green and blue. This corresponds to $2^8$ or 256 separate intensity levels of each of red, green and blue respectively and $2^{24}$ different colour values. A colour display capable of displaying this many colours can approximate a continuous tone image to such a degree that for all practical purposes the display can be considered to be a continuous tone display.

In order to conceptualize the range of colours that can be printed by this method it is helpful to map these colours into a unit cube as shown in FIG. 2. The individual contributions of each of the 3 separate subgroups at any one particular point are added together to yield the final colour. For example, the main diagonal of the cube, with equal amounts of each primary, represents the different grey levels or grey scale, from black (0,0,0) to white (1,1,1)

Many display devices are unable to actually display the full range of colours provided by, for example, a 24 bit input pixel. For example, a black and white raster image display can only display two colours, namely black and white and is known as a bi-level device. Other colour display devices can only display a finite number of discrete intensity levels for each primary colour. By way of further example, in a colour bi-level device, such as a bi-level ferroelectric liquid crystal display (FLCD), each pixel element on the screen can be at just two intensity levels, either fully on or fully off. If, for example, a display device can display red, green, blue and white primary colours the total number of different colours that each pixel can display will be $2^4=16$ different colours.

If the input to the display device assumes that there is a larger number of intensity levels then there will be an error in the colour displayed, being the difference between the exact pixel value required to be displayed and the approximated value actually displayed. Methods have been developed to increase the number of colours displayable on an discrete colour display device such as a bi-level colour display. The methods used are known generally as halftoning. For an explanation of the different aspects of halftoning, reference is made to 'Digital Halftoning' by Robert Ulichney, published in 1991 by MIT Press.

One method described by Ulichney to improve the quality of a displayed image is called error diffusion. This process was developed by Floyd and Steinberg for a single colour (black or white) display and is described in "An Adaptive Algorithm for Spatial Gray Scale", Society for Information Display 1975 Symposium Digest of Technical Papers, 1975, 36. In the Floyd and Steinberg algorithm, the error associated with each pixel value is added to the values of some of the neighbouring pixels of the given current pixel in such a manner that the sum of these additions is equal to the error associated with the pixel value. This has the effect of spreading or diffusing the error over several pixels in the final image to give an improved quality image. An example of this process is shown in FIG. 3. In this example a decision is made to spread the error associated with a current pixel 3, such that two eighths of the error is assigned to a pixel 4 on the right of the current pixel 3, one-eighths is assigned to its neighbour 5, two eighths is assigned to a pixel 6 below the current pixel 3, one eighths is assigned to pixels marked 7, 8, 9 respectively.

One method known of extending the error diffusion process to three dimensions so as to be to be applicable to colour displays is that set out in 'Color Image Quantization for Frame Buffer Display' by Paul Heckbert, published in Computer Graphics, Volume 16, Number 3, July 1982, pages 297–304 and is also disclosed in an IBM Technical Disclosure Bulletin Vol. 29, No3, August 1986, Pages 1329 to 1334.

In the Heckbert process, the different possible output values of the display are chosen as the representative colours of the colour gamut of displayable images. A vector measure in a 3-dimensional colour space representing the distance between the nearest displayable colour value and a current input colour value is computed and this value is then preferably added to neighbouring pixels using the Floyd and Steinberg process.

High resolution displays in use commonly have pixel resolutions in the order of 1,280×1,024=1,310,720 pixels and a refresh rate in the order of 60 Hz. As mentioned previously, each pixel can have 24 bits associated with its colour value.

It therefore follows that, if any processing of the pixels must be undertaken, then the high input rate of pixels would require this processing to be performed at high speeds.

In the above example, a total capacity of over 235 mega bytes per second would have to be handled by a system wishing to process the display input data. Error diffusion is an example of process which requires high processing rates, as each pixel must be looked at and the errors diffused to neighbouring pixels. Additionally, the error diffusion process is difficult to implement in any other than a serial manner as the error diffusion of one pixel element will influence all subsequent elements that are to be processed.

By the choice of neighbouring pixels that are below or to the right of a current pixel, the error diffusion can be achieved by one top-to-bottom pass over the image, as the errors diffused from a current pixel can then only influence subsequent pixels.

It is an object of the present invention to provide a method and apparatus for error diffusion of images at a high pixel rate through the use of parallelism.

SUMMARY OF THE INVENTION

According to one aspect of the present invention, there is provided a method for error diffusion of image data, said method comprising the steps of:

inputting lines of input data corresponding to a current input image;

dividing the current input image into a plurality of areas;

error diffusing a current pixel from a current line in each area to produce a corresponding output value and an associated error value; and adding the associated error value to neighbouring pixels in the same area as the current pixel or to pixels on a non-current line of other areas.

According to another aspect of the present invention, there is provided a parallel error diffusion apparatus comprising:

image input means adapted to input image data to be displayed;

input storage means adapted to store said image data received from said image input means, in a plurality of areas;

a corresponding plurality of error diffusion units, each said error diffusion unit including:

pixel input means, for receiving input pixels of a current line from said input storage means;

error diffusion means adapted to error diffuse each said input pixel to produce output pixels and error diffusion data;

error spreader means for adding said error diffusion data firstly to adjacent pixels of said input pixel within the corresponding area and secondly to pixels in the non current line of adjacent areas; and In accordance with another aspect of the present invention there is provided a parallel error diffusion apparatus for error diffusing an image consisting of lines of pixels, said apparatus comprising:

input correction means adapted to receive an input image on a line by line basis and to add to each pixel, error diffusion fragments from surrounding pixels, a plurality of error diffusion units which operate substantially independently and in parallel on different segments of a line and interchange error diffusion data for pixels at the boundaries of each segment.

BRIEF DESCRIPTION OF THE DRAWINGS

A preferred embodiment of the present invention will now be described with reference to the remaining drawings in which:

FIG. 13 is a representation of the data sequence of the preferred embodiment;

FIG. 14 is a further representation of the data sequence of the preferred embodiment;

FIG. 15 is a further representation of the data sequence of the preferred embodiment;

FIG. 16 is a further representation of the data sequence of the preferred embodiment;

FIG. 20 is a schematic diagram of the inter-parallel 3-dimensional error diffusion unit of FIG. 19;

FIG. 21 is a schematic diagram of the current line pixel pipeline of FIG. 19;

DESCRIPTION OF THE PREFERRED EMBODIMENT

In the present embodiment, a real time error diffusion process is achieved by parallelizing the error diffusion process so that there are a multitude of error diffusion processes operating simultaneously, thereby reducing the speed requirements with which an input image must be handled.

Figure 1:
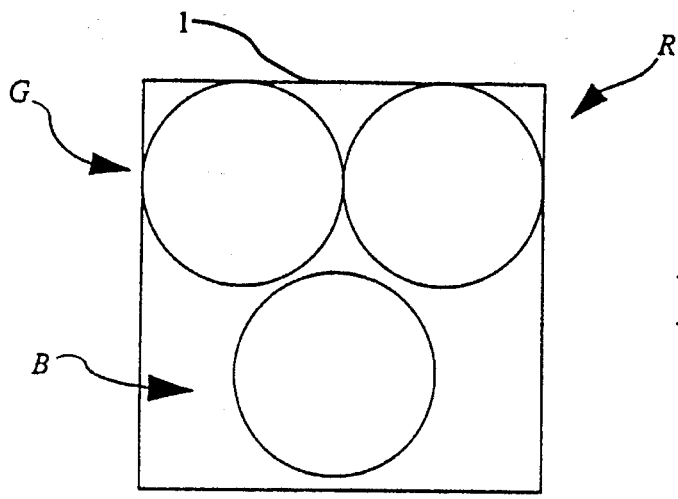
FIG. 1 is a view of a conventional single pixel of a CRT type display.
Figure 2:
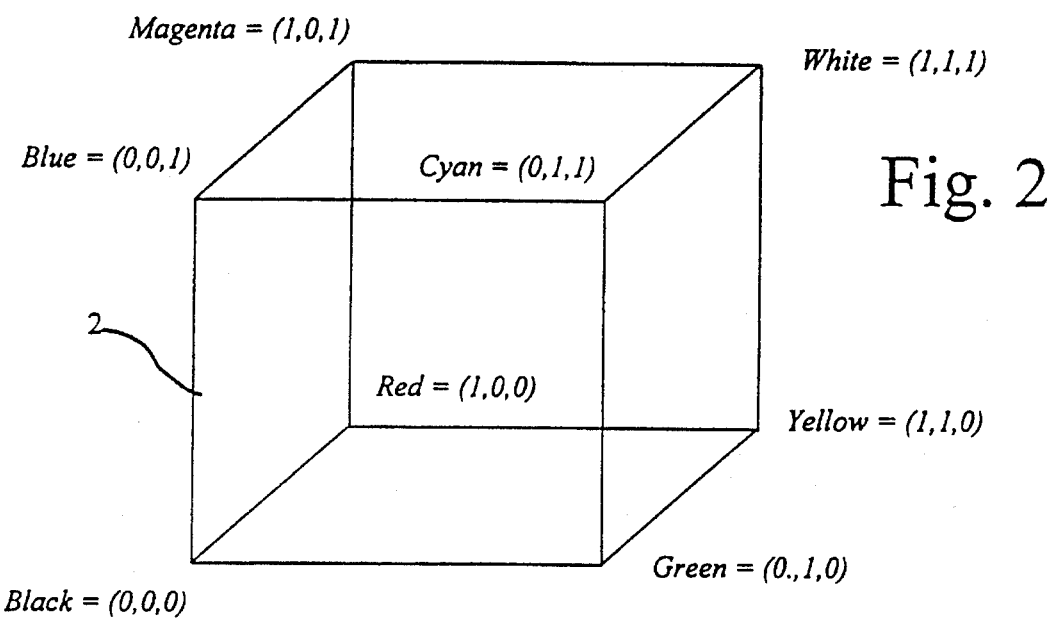
FIG. 2 is a representation of a unit of colour cube.
Figure 3:
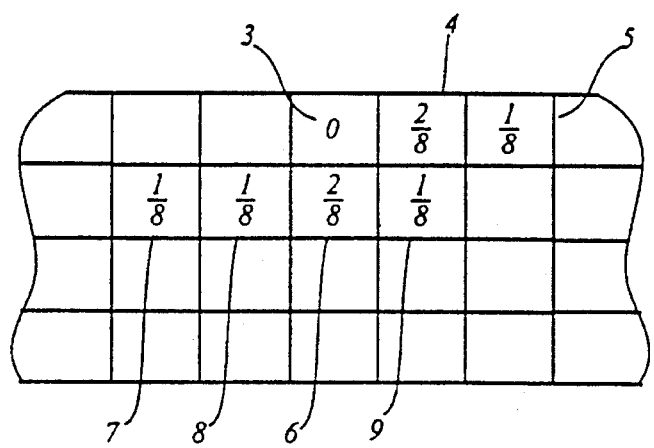
FIG. 3 is a diagrammatic representation of the Floyd and Steinberg error diffusion process.

As mentioned previously, FIG. 3 shows the normal Floyd and Steinberg error diffusion process operating on one line of an input image in a frame buffer. In this process, the current pixel 3, is thresholded according to the error diffusion process to be used and an output colour O, is obtained in addition to an error measure for distribution to adjacent pixels. This error is added to the value of adjacent pixels 4, 5, 6, 7, 8, 9 in the nature as shown. As a result of this process the values of these pixels are changed.

Figure 4:
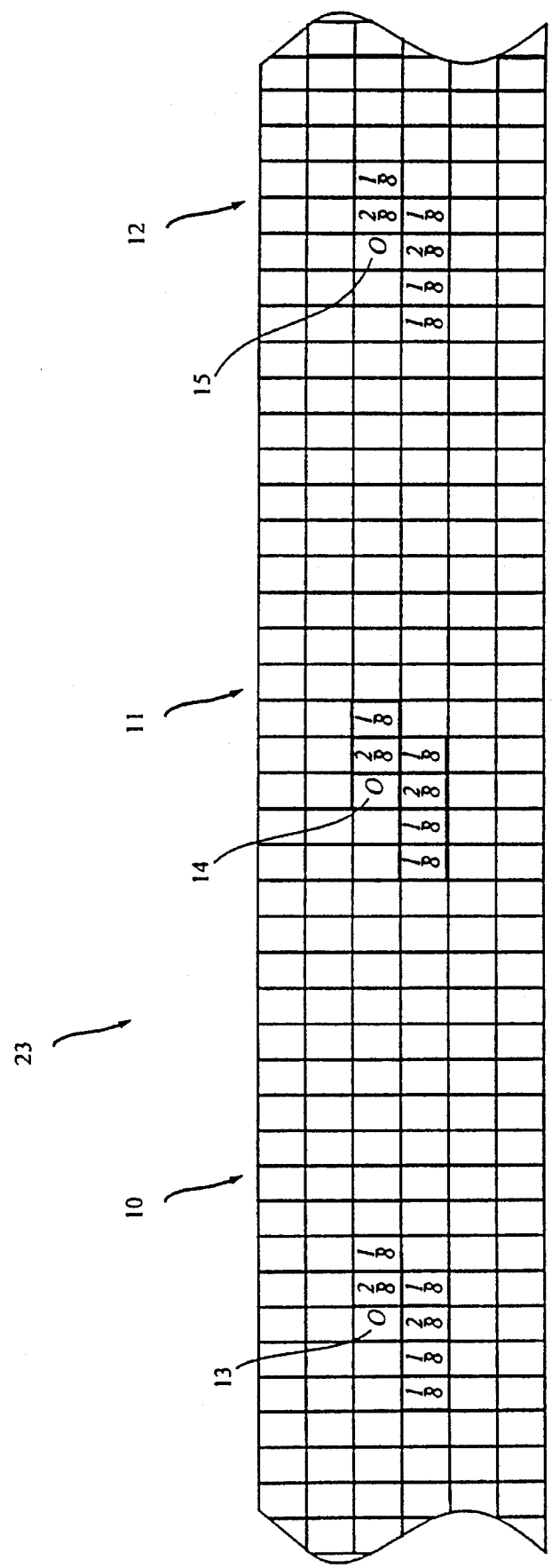
FIG. 4 is a representation of an initial state of the preferred embodiment.

In the present embodiment, as shown in FIG. 4, an input image frame buffer 23 is divided into a predetermined number of areas 10, 11, 12 etc. depending on the degree of parallelism that is required. Multiple error diffusion processes indicated at 13, 14, 15 are then begun in parallel on a line in each different area of the input frame buffer. Each process diffuses its error to adjacent elements as shown, and produces an output value (O) for display on the output device, as well as corresponding error values for diffusion to adjacent pixels as shown. The error diffusion processes then continues to error diffuse adjacent pixels on a current line.

Figure 5:
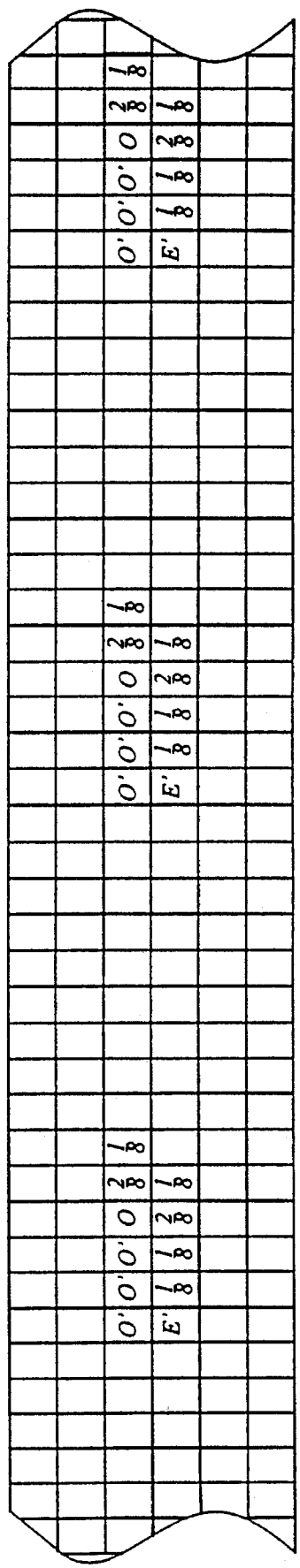
FIG. 5 is a representation of an operating state of the preferred embodiment.

Referring now to FIG. 5, there is shown the state of the input lines when each process is error diffusing the fourth pixel in its area. These processes continue until they reach the end of their respective areas.

Figure 6:
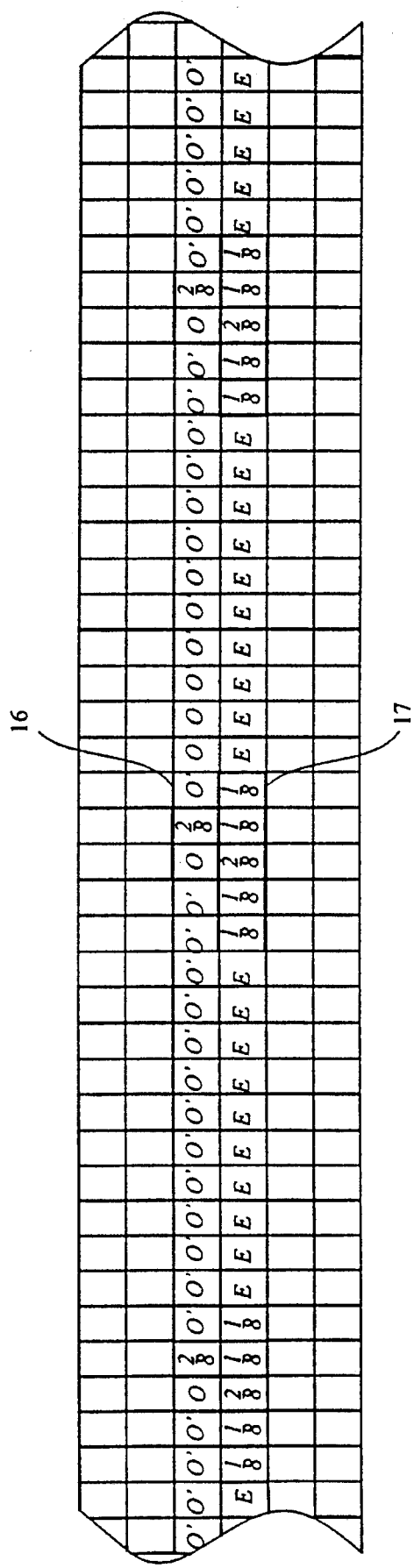
FIG. 6 is a representation of a state of the preferred embodiment of the present invention when each error diffusion process has reached the penultimate pixel in its area.

Referring now to FIG. 6, upon reaching the second to last pixel a problem occurs in that normally it is desired to error diffuse the second to last pixel in the area to pixel 16. However this is not possible because this pixel 16 has already been error diffused and its output determined. The error value for pixel 16 is instead added to the pixel 17 on the next line.

Figure 7:
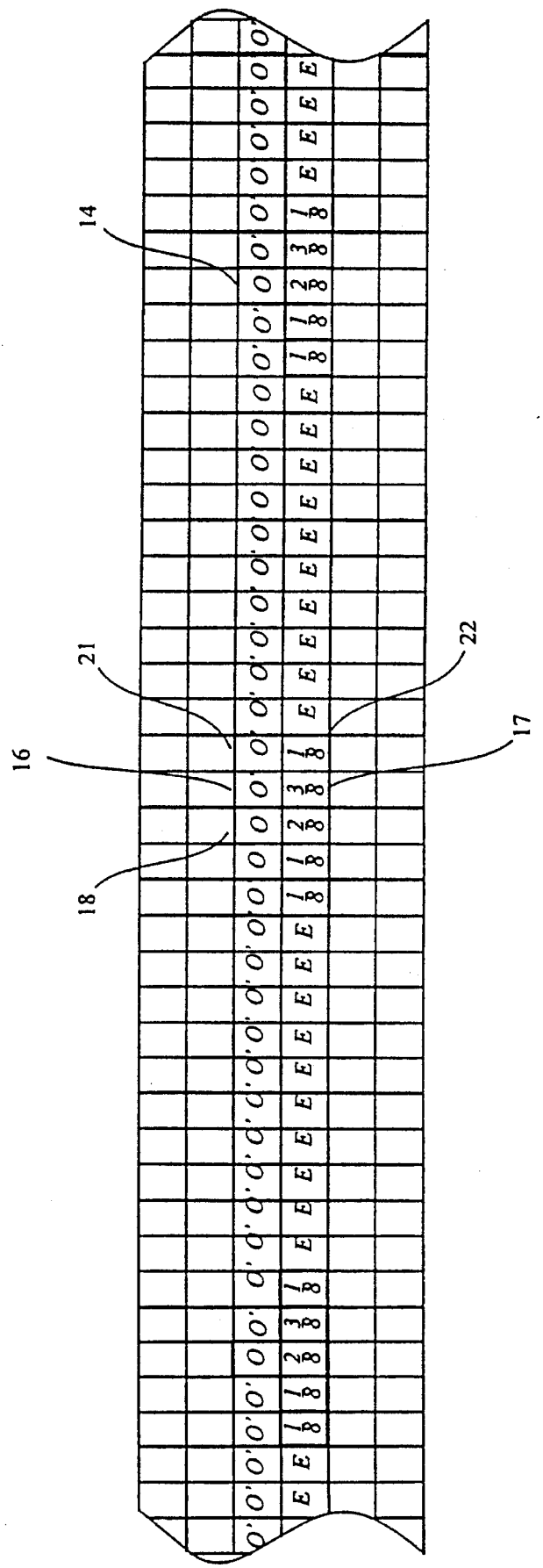
FIG. 7 is a representation of a state of the preferred embodiment when each error diffusion process has reached the final pixel in it area.

As shown in FIG. 7, a further problem also arises when it is required to error diffuse the last pixel 18 of a given area. Normally, it is required to diffuse the error associated with pixel 18 to the pixels 16, 21. However the output values for these pixels have been previously determined by the error diffusion process 14 (FIG. 4). The values that would have been added to pixels 16, 21 are instead added to the pixels 17, 22. Hence pixel 17 is allotted three-eights of the error associated with pixel 18 rather than receiving only one eighth of the error for the pixel 18. The other error diffusion processes (e.g. 14) encounter similar problems at the edges of their respective areas and these problems are solved by using the same methodology.

As can be seen from the above description, the use of multiple error diffusion processes allows the error diffusion process to be carried out in parallel while still being able to maintain a high input data rate which may be required. This has been achieved by carrying out the normal error diffusion process in parallel on different areas of the input line, and making adjustment for those pixels located at the end of these areas. It has been found in practice that this adjustment produces minimal affects on the output image.

Figure 8:
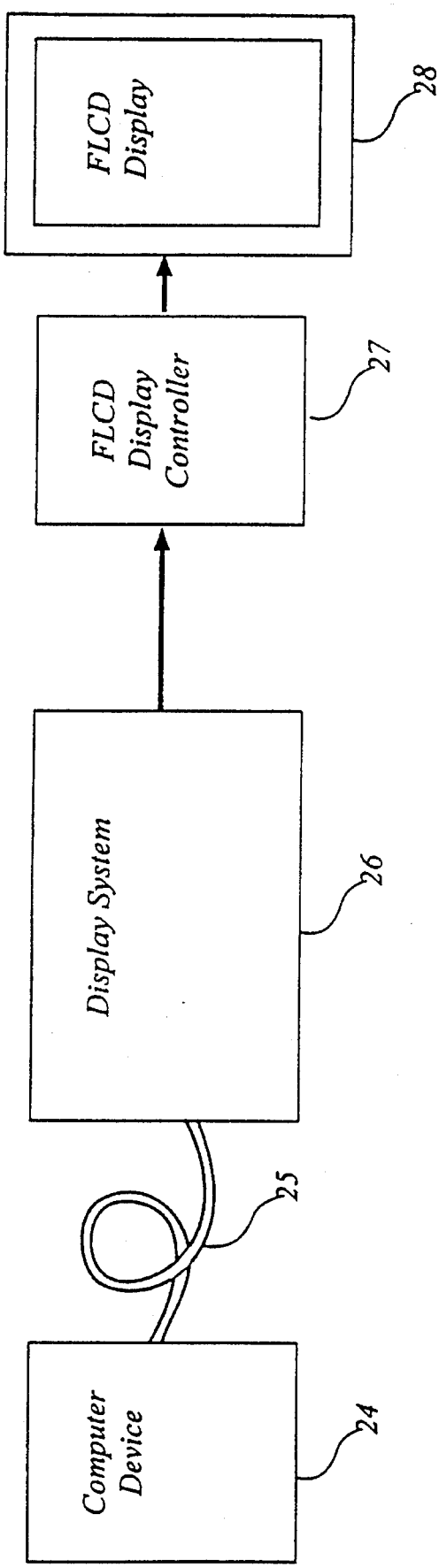
FIG. 8 is a schematic block diagram representation of an exemplary, arrangement incorporating the preferred embodiment.

As shown in FIG. 8, a cable 25 interconnects a computer device 24 with a display system 3 which converts video data received from the computer device 24 into a format suitable for display on an FLCD display 28.

A display controller 27 is responsible for controlling the FLCD display device 28 and receives input in the form of four colour channels of information for each pixel of the FLCD display device 28. It is assumed in the present embodiment that each pixel of the FLCD display device 28, is capable of displaying the bi-level colours of red, green, blue and white. Hence, the input to the display controller 27, includes 4-bits of pixel colour information as well as associated location and control information. As each of the pixel's colours is capable of displaying two levels, either off or on, the total number of different colours will be 2×2×2×2=16 different colours.

Figure 9:
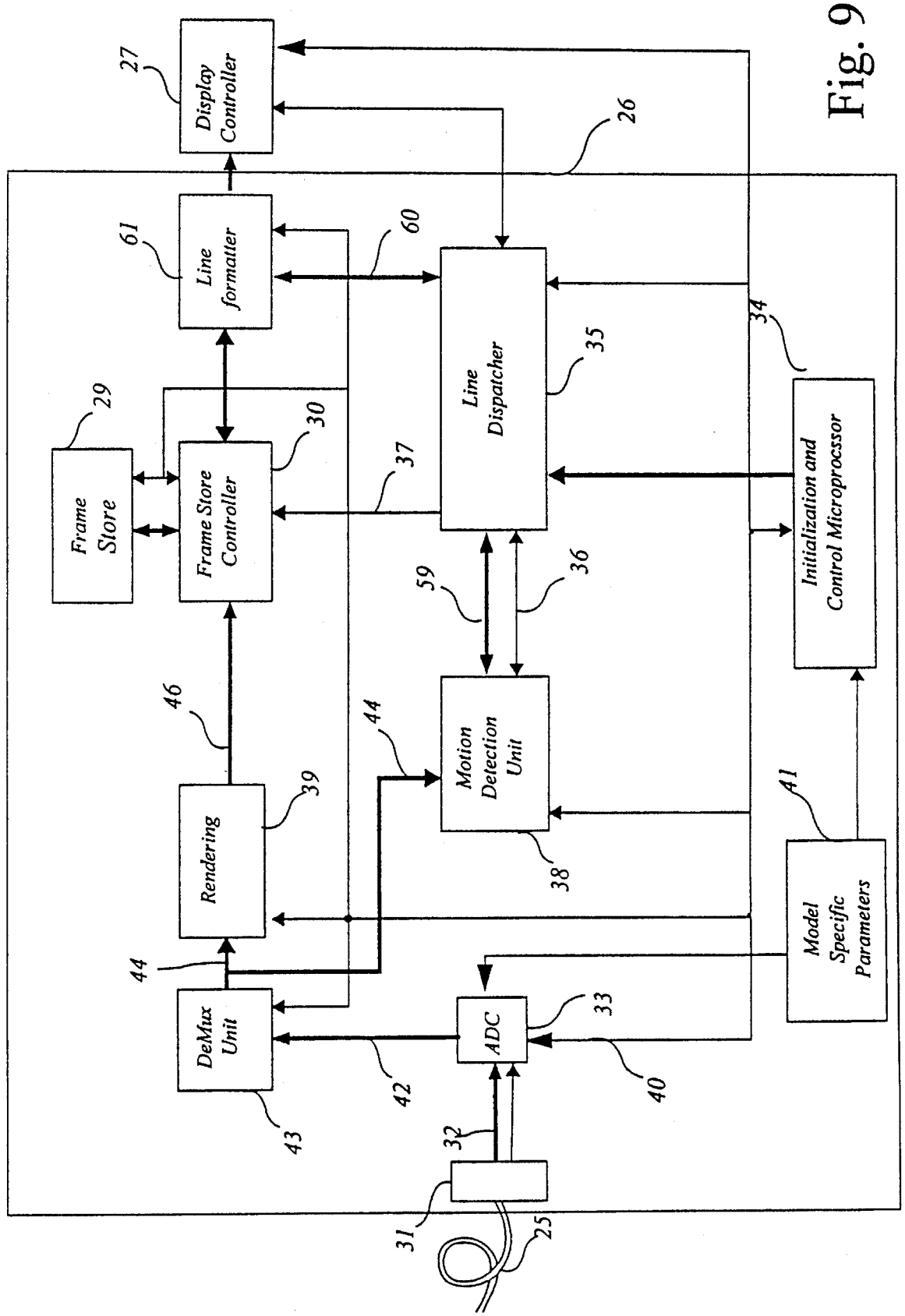
FIG. 9 is a schematic block diagram representation of the preferred embodiment.

Referring now to FIG. 9, there is shown the display system 26 in more detail. The analogue input to the display system 26 is achieved by means of the cable 25. The synchronization information of the analogue input is divided or separated from the colour information by an input divider 31. The colour information and synchronization information are then forwarded separately to an analogue to digital conversion unit 33. The Red, Green and Blue analogue input channels 32 from the divider 31 are fed to three analogue to digital converters in the analogue to digital conversion unit 33. Each analogue to digital converter converts its analogue channel input information to a corresponding digital value. The control information is also fed to the analogue to digital conversion unit 33 and is decoded and digitized to produce system control information such as pixel clock (PCLK), line retrace and frame retrace signals. The control information is output with the pixel colour information in addition to being supplied to the remainder of the system 26 via a control channel 40. The control channel 40 couples these signals to various portions of the overall system including an initialization and control microprocessor 34, a demultiplexer 43, a rendering unit 39, line formatter 61, a line dispatcher 35, a frame store 29, a frame store controller 30, a motion detection unit 38 and the display controller 27.

The analogue to digital conversion unit 33 requires model specific parameters, crystal timing input information, input control synchronization information as well as the three analogue input channels in order to produce the corresponding binary output pixels for each input pixel at the pixel clock rate which is determined by the model specific parameters. Preferably the model specific parameters are stored in a storage device 41, and are loaded into the analogue to digital conversion unit 33, at start-up time by the initialization and control unit 34.

As an alternative to an analogue input, the cable 2 can convey an input signal in a digital format direct to an input buffer (not illustrated but known in the art), that substitutes for the analogue to digital conversion unit 10.

In order for a single display system 26 to be connected to a multitude of different computer systems, the cable assembly 25 can be preferably fitted with a model specific crystal and/or the storage device 41 (typically a serial EEPROM) from which the initialization and control microprocessor 34 can load model specific parameters into the display system controllers at start-up time. Model specific parameters which tend to vary from system to system include the frequency of the pixel output clock of the computer device 24, the number of pixels per line, the number of lines per frame, horizontal blanking time, vertical blanking time, analogue to digital gain and offset parameters etc. These parameters can then be stored in the cable 25 with different cables being available for different computer devices 24, thereby increasing the versatility and utility of the display system 26.

The number of binary bits and hence the resolution with which digital values are output from the analogue to digital conversion unit 33, can vary according to factors such as the cost and speed of the A/D Converters used. In this embodiment, each A/D converter of analogue to digital conversion unit 33 outputs 8 bits of information for its respective input colour on an A/D output bus 42. Hence, the A/D output bus 42 is at least 24 bits wide, representing a single pixel of display information. Additionally, the analogue to digital conversion unit 33 outputs pixel clocks, frame and other synchronization information on the A/D output bus 42. A demultiplexer 43 groups together two adjacent pixels and outputs them together with clocking and synchronisation information on a bus 44 at half the input rate to the demultiplexer 43. This has the effect of halving the speed with which the rest of the display system 26 is required to work.

The dual pixel output format from the de-multiplexer 43 is fed to the rendering unit 39 which for each 24 bit input pixel information produces a 4-bit output in the form of one bit for each of Red, Green, Blue and White (RGBW) pixel data for the FLCD Display 28. The groups of pixels are output on the rendering unit's output bus 46.

Figure 10:
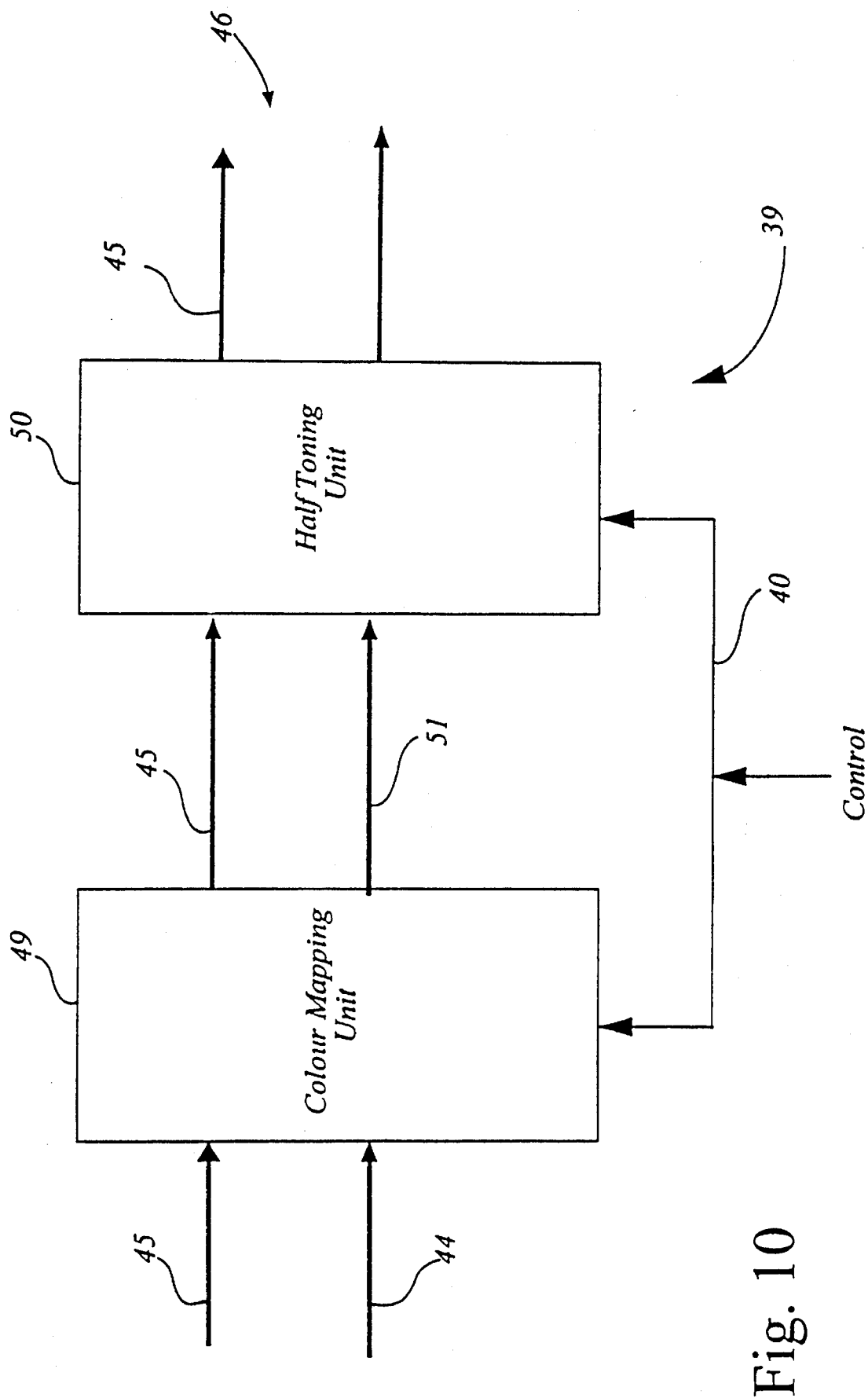
FIG. 10 is a schematic block diagram representation of the rendering unit of the preferred embodiment.

Turning now to FIG. 10, the rendering unit 39 consists of a colour mapping unit 49 and a halftoning unit 50. The demultiplexer output bus 44 connects to the colour mapping unit 49 to supply RGB pixel information and sychronization information. The sychronization information includes the pixel clock, vertical sync and horizontal sync signals. The colour mapping unit 49 performs a series of transforms on the input RGB pixel data before sending the transformed pixels and sychronization information to the halftoning unit 50, via a colour mapping to halftoning pixel bus 51, to halftone the pixels to produce 4-bit pixel output. This output appears on a rendering unit output bus 46.

Figure 11:
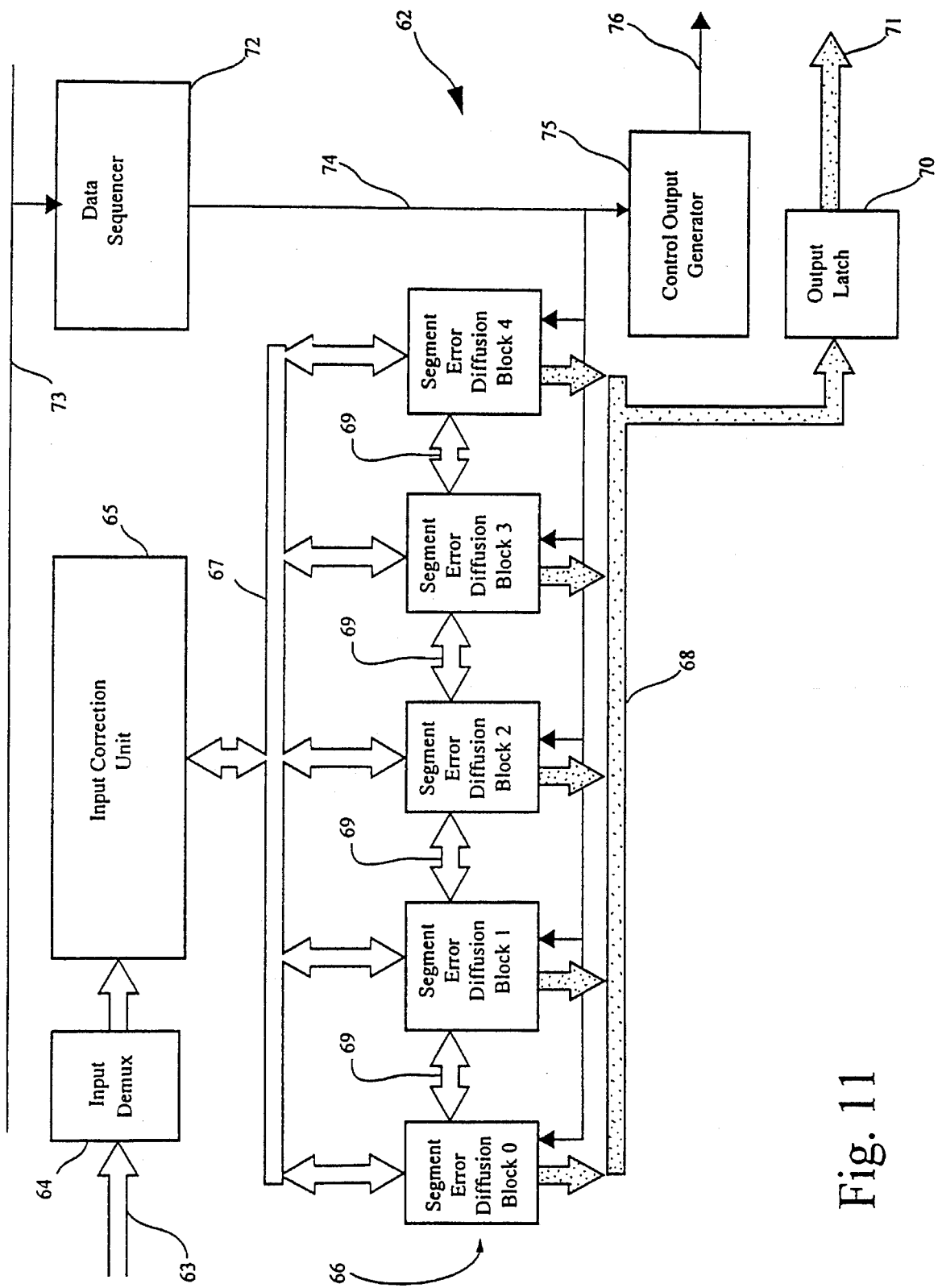
FIG. 11 is a schematic diagram view of an apparatus of the preferred embodiment.

Referring now to FIG. 11, there is shown a block parallel error diffusion apparatus 62 implementing the above outlined methodology. The block parallel error diffusion apparatus 62 is designed specifically but not exclusively to work with a colour display system referred to above.

Input pixels 63 are provided two at a time at a rate of 70 MHz, with each pixel being 24 bits in length, with 8 bits of colour information for each of the red, green and blue colour portions of the pixel. The input pixels 63 are demultiplexed in an input demultiplexer 64 so that the rest of the block parallel error diffusion apparatus 62 can operate on groups of 4 pixel blocks at 35MHz, being half the input frequency.

The output data bus 71 of the block parallel error diffusion apparatus 62 is in the form of 4 groups of 4-bit pixel data. The output pixels are intended for display on a device capable of displaying bi-level Red, Green, Blue and White (RGBW) pixels. Hence one bit of each 4-bit pixel data is used to display one of the RGBW colours.

The input pixels 63 are forwarded in parallel to an input correction unit 65, whereby the errors which have been diffused from a previous input line of pixels are added to the current input line of pixels as the corresponding input pixels are coming into the input correction unit 65. The errors to be diffused come from an array of five Segment Error Diffusion Blocks (SEDBs) 66 numbered 0 to 4. Upon correction of the input data, the results of input correction for each pixel is written to the required SEDB.

The three dimensional full colour error diffusion method carried out in the SEDB 66 is set out in 'Color Image Quantization for Frame Buffer Display' by Paul Heckbert, published in Computer Graphics, Volume 16, Number 3, July 1982, pages 297–304.

By applying a 3-D error diffusion technique disclosed in Hechbert's paper, above cited, to five separate segments of an image, in parallel, it is possible to provide a reduced speed image processing for a display device.

Figure 12:
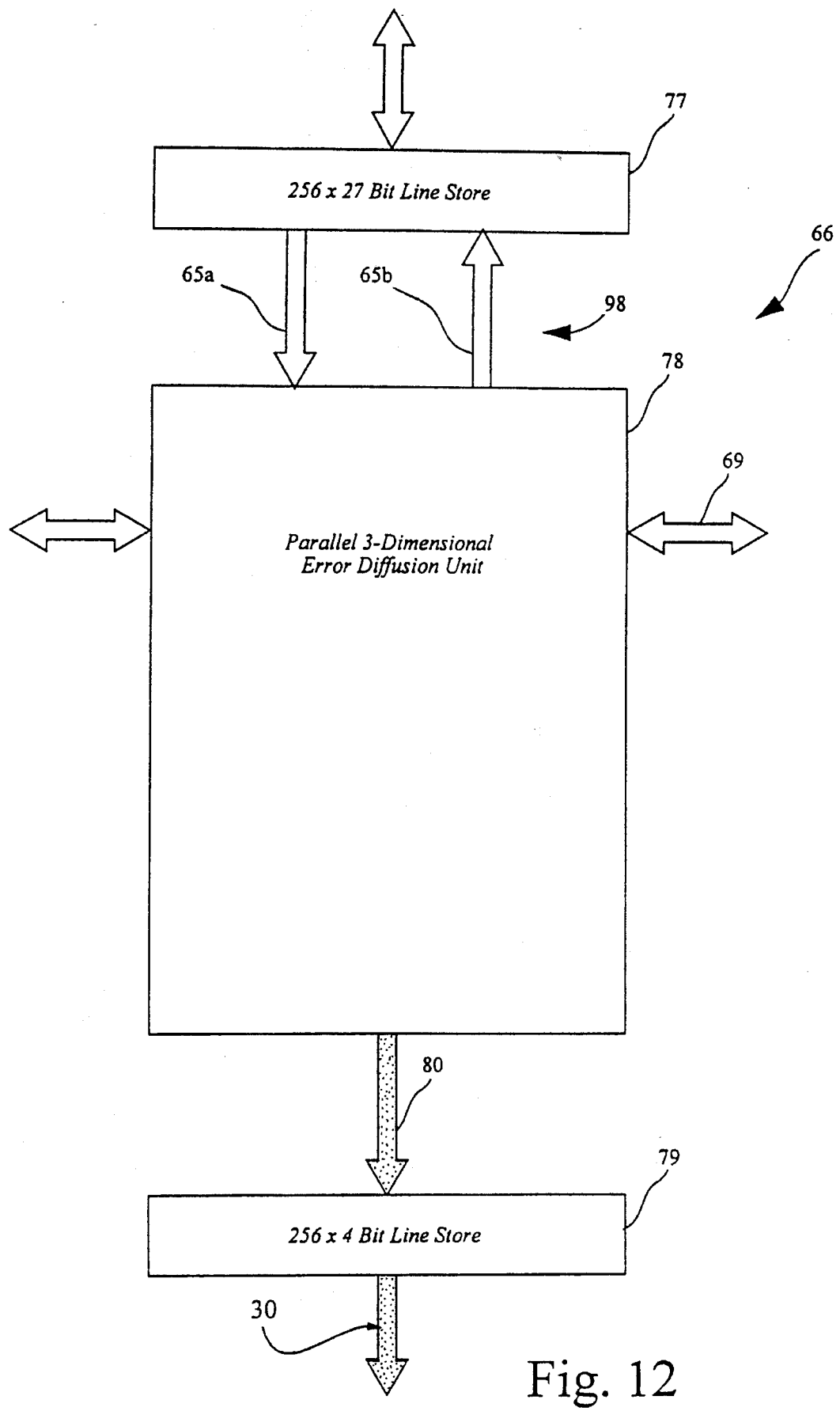
FIG. 12 is a schematic diagram representation of the segment error diffusion block of FIG. 11.

Referring now to FIG. 12, there is shown a single SEDB 66, in more detail. Each SEDB 66 is made up of a 256×27 bit RGB line store 77, a parallel 3-dimensional error diffusion unit (P3DEDU) 78, and a 256×4 bit RGBW line store 79. The 27 bits per entry in 256×27 bit RGB line store 77 represents a 9-bit value for each of R, G, and B, which is required to correctly represent positive and negative values for the errors and input corrected data.

Each SEDB 66 operates on a line segment consisting of one fifth of the input line and each has enough memory to store up to 256 pixels of intermediate data. Each SEDB 66 takes one-fifth of the input line period to acquire input corrected data from the input correction unit 65, then spends the remaining four-fifths of the input line period completing the error diffusion process on this data. The SEDBs operate in a staggered fashion on a line as input data for each segment becomes available. The error diffusion process produces a corresponding RGBW output, in the form of RGBW values for each pixel, which are forwarded out of each SEDB on a RGBW output 68 at the same time as the SEDB 66 is also is acquiring input corrected data for the next line. Hence, there is exactly one line period of delay between input and output data for the SEDB 66.

Referring now to FIG. 11 and FIG. 12, the SEDB 66 operates in two stages. In the first stage the P3DEDU 78 is idle. The 256×27 bit RGB line store 77 provides four samples per cycle to the input correction unit 65 (FIG. 11), and receives four corrected samples back each cycle. At the same time, the 256×4 bit RGBW line store 79 is accessed at four samples per cycle, driving results to an output latch 70 seen in FIG. 11. This stage lasts for approximately one-fifth of the input line period, corresponding to the time in which data for the particular segment is coming into the block parallel error diffusion apparatus 62.

In the second stage, the SEDB 66 applies the error diffusion algorithm to each sample in the 256×27 bit RGB line store 77 in turn, writing the resulting errors for the next line back into the 256×27 bit RGB line store 77 and the RGBW output into the 256×4 bit RGBW line store 79. This stage lasts for the remaining four-fifths of the input line period.

As well as acquiring data from the input correction unit 65, each SEDB 66 also exchanges data with adjacent SEDB via a SEDB to SEDB bus 69, to allow correct diffusion over segment boundaries thereby allowing boundary pixel elements to be correctly updated.

The output data from the SEDB 66 is output in raster order. This output data is latched in the latch 70, and synchronised before being forwarded on the bus 71 for display or storage. The output data is driven out of the block parallel error diffusion apparatus 62 as four parallel samples at one half of the input clock rate.

A data sequencer 72 receives vertical and horizontal information signals 73 as well as pixel clock information, and generates control signals 74 to the SEDB 66 and a control output generator 75. The control output generator 75 generates any frame, line and pixel validity signals that may be required by subsequent devices.

The choice of particular coefficients and pixels to which an error diffusion process assigns the error associated with the current pixel, can vary substantially and this is known in the art.

In order to understand the real time operation of the block parallel error diffusion apparatus 62 a detailed example of operation will now be presented with reference to FIG. 13 to FIG. 16 in addition to FIG. 11 and FIG. 12.

FIG. 13 shows the state of the SEDBs at the beginning of line (m) of the input. The 256×27 bit RGB line stores contain data for the previous line (m−1). For the first segment in the line, the 256×27 bit RGB line store 77 contains errors diffused from line (m−1) to line (m); this segment has been completely error diffused. The 256×4 bit RGBW line store 79 for the first segment contains RGBW data for line (m−1), waiting to be output. All of the other line segments are only partly diffused. For each of these segments, 256×27 bit RGB line stores contains error data for pixels which have been diffused, and corrected input data from line (m−1) for the remaining pixels, waiting to be diffused. For each segment there is RGBW data in the 256×4 bit RGBW line stores for each of the diffused pixels. It can be seen from FIG. 13 that, at the beginning of input line (m), SEDB1 has completed error diffusion on three quarters of the second line segment, SEDB2 has completed error diffusion of one half of the third line segment, SEDB3 has completed error diffusion on one quarter of the fourth line segment, and SEDB4 is just about to commence error diffusion on the fifth and final line segment.

FIG. 14, shows the situation after one fifth of line (m) has been input to the block parallel error diffusion apparatus 62. During the time while this first line segment is being input, the P3DEDU 78 for SEDB0 is idle. The input correction unit 65 reads errors from 256×27 bit RGB line store 77 for the first segment, and writes corrected line m data back to the same memory. At the same time, the output latch 70 reads data from the 256×4 bit RGBW line store 79 for the first segment, driving it out of the block parallel error diffusion apparatus 62. Both the input correction unit 65 and the output latch 70 access the line stores at the full data rate, i.e. up to 140M Samples per second. While the first line segment is being input, the four P3DEDU 78 units for the second, third, fourth and fifth segments each complete error diffusion on one quarter of their respective segments, working on stored data. By the time the input line is one fifth complete, SEDB0 contains a complete segment of corrected input data for line m ready for error diffusion, SEDB1 has completed its diffusion of line (m−1) so that the input correction unit 65 and output latch 70 can start working on it, and SEDB2, SEDB3 and SEDB4 have all moved one-quarter of a segment further ahead.

FIG. 15 shows the state of the SEDBs, further into input line (m). The input correction unit 65 is writing line (m) input data into the fourth segment. The output latch 70 is reading line (m−1) diffusion results from the same segment. The P3PEDU unit of SEDB3 is idle. The P3PEDU units for the first three segments are all working on corrected input data for line (m), which has been written previously by the input correction unit 65. RGBW data for line m is building up in the 256×4 bit RGBW line store 79 of the first three segments. The P3PEDU of SEDB4 is completing error diffusion on line (m−1) for the last segment.

FIG. 16, shows the state at the completion of line (m), which is similar to that at the start of line (m), except that all data is one line further advanced. The SEDBs are now ready for the input of line (m+1)

Two important points should be noted from the above description. Firstly, each P3PEDU unit of each SEDB is idle for one fifth of the input line period, to allow the input correction unit 65 and the output latch 70 exclusive access the line stores for that segment. Each P3PEDU unit must therefore complete the error diffusion for its segment in the remaining four-fifths of the line period. This implies that the P3PEDU units run at one-fourth of the input data rate, in order to error diffuse one-fifth of the line in four-fifths of a line period.

The second point to note is that both the input correction unit 65 and the output latch 70 access the line stores at the full data rate, up to 140MSamples per second. As the internal clock rate of the block parallel error diffusion apparatus 62 is one-quarter of the input data rate, input correction unit 65 and the output latch 70 access the line stores four samples at a time. This represents 108 bits of data read and written to the 256×27 bit RGB line store 77 per cycle when the input correction unit 65 is accessing them.

Figure 17:
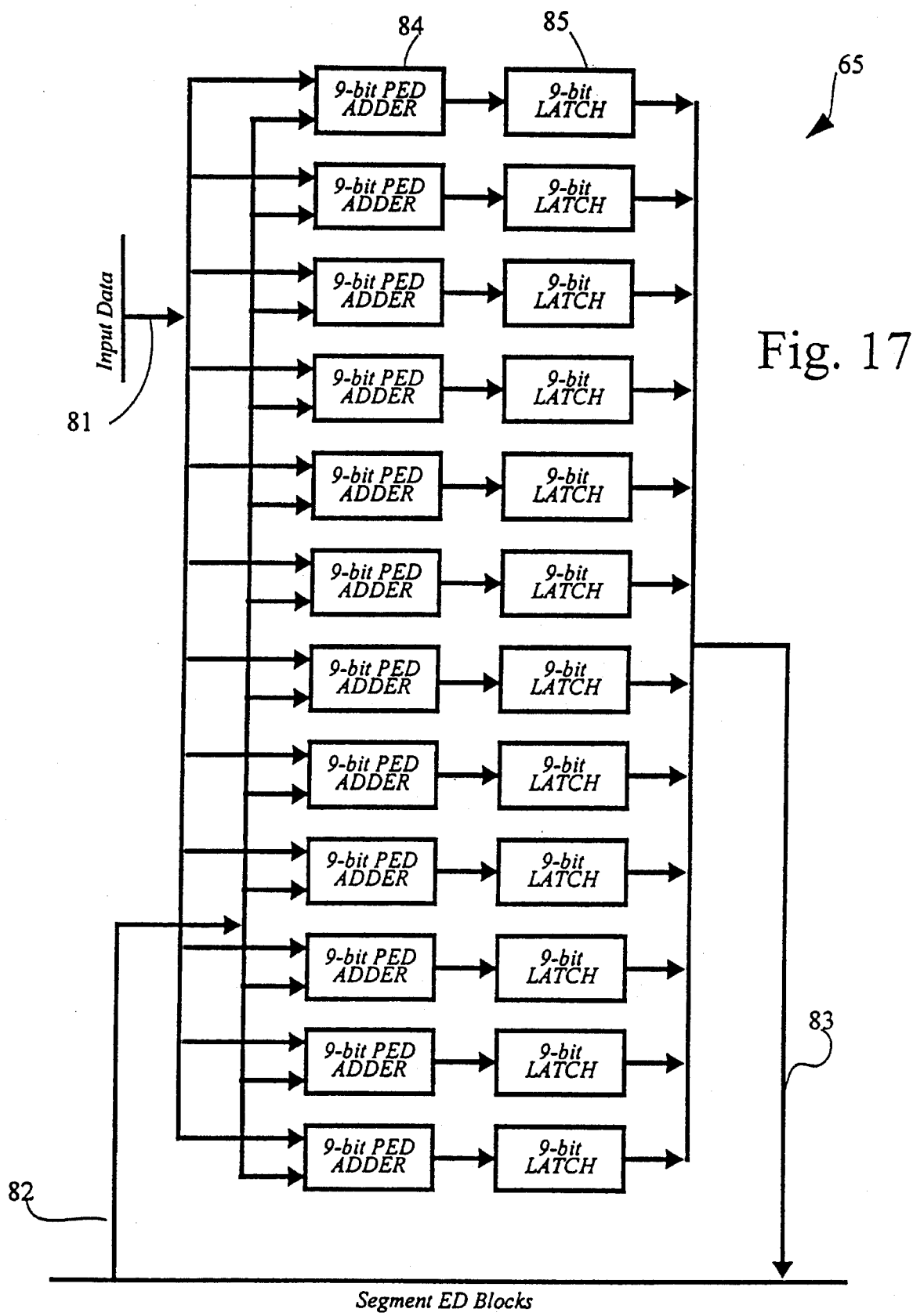
FIG. 17 is a schematic diagram view of the input correction unit of FIG. 11.

Referring now to FIG. 17, there is shown the input correction unit 65, of FIG. 11, in more detail. The input correction unit 65 performs the arithmetic required to diffuse errors between lines of an image, by adding errors from one line into incoming data for the next line. The input correction unit 65 can handle data at up to 140M Samples/second. The input correction unit 65 handles the input data 81 for a line, four input samples at a time. SEDB error data 82 from the SEDBs, and incoming data are sent to the input correction unit 65. It sends its results, input corrected data 83, back to the SEDBs.

The input correction unit 65 is made up of 12 identical 9-bit parallel error diffusion (PED) adders 84, and 12 nine-bit latches 85 for the results of the additions. Each PED adder 84 takes one lot of input data 81 and one lot of SEDB error data 82 from the SEDB input interface. The latched adder results go to the SEDB output interface 83. The PED adder 84 is specifically designed to use a 9-bit PED number system. It is implemented using a standard 9-bit two's complement adder, with the overflow conditions modified for the special number system. When the adder overflows, the result is forced to the appropriate positive or negative limit. In the PED number system, an input is negative if the top two bits are set to 1; otherwise it is positive. The algorithm for the PED adder 84 is as follows:

a,b,c: nine bit PED values
c_out: single bit carry out
c = a + b; {also returns carryout on c_out}
if(a(8)=0 OR a(7)=0) AND (b(8)=0 OR b(7)=0) {both inputs positive}
   if(c_out=1) OR (c(8)=1 AND c(7)=1) {carry out or result negative}
      c = 101111111;   {maximum positive value}

-continued

```
if(a(8)==1 AND a(7)==1) AND (b(8)==1 OR b(7)==1){both inputs negative}
    if(c(8)==0 OR c(7)==0)      {result positive}
        c = 110000000;           {maximum negative value}
```

Referring again to FIG. 11 and FIG. 12, the 256×27 bit RGB line store 77 is shown to interface with the data sequencer 72, input correction unit 65 and also the P3DEDU 78 in the same SEDB 66.

Figure 18:
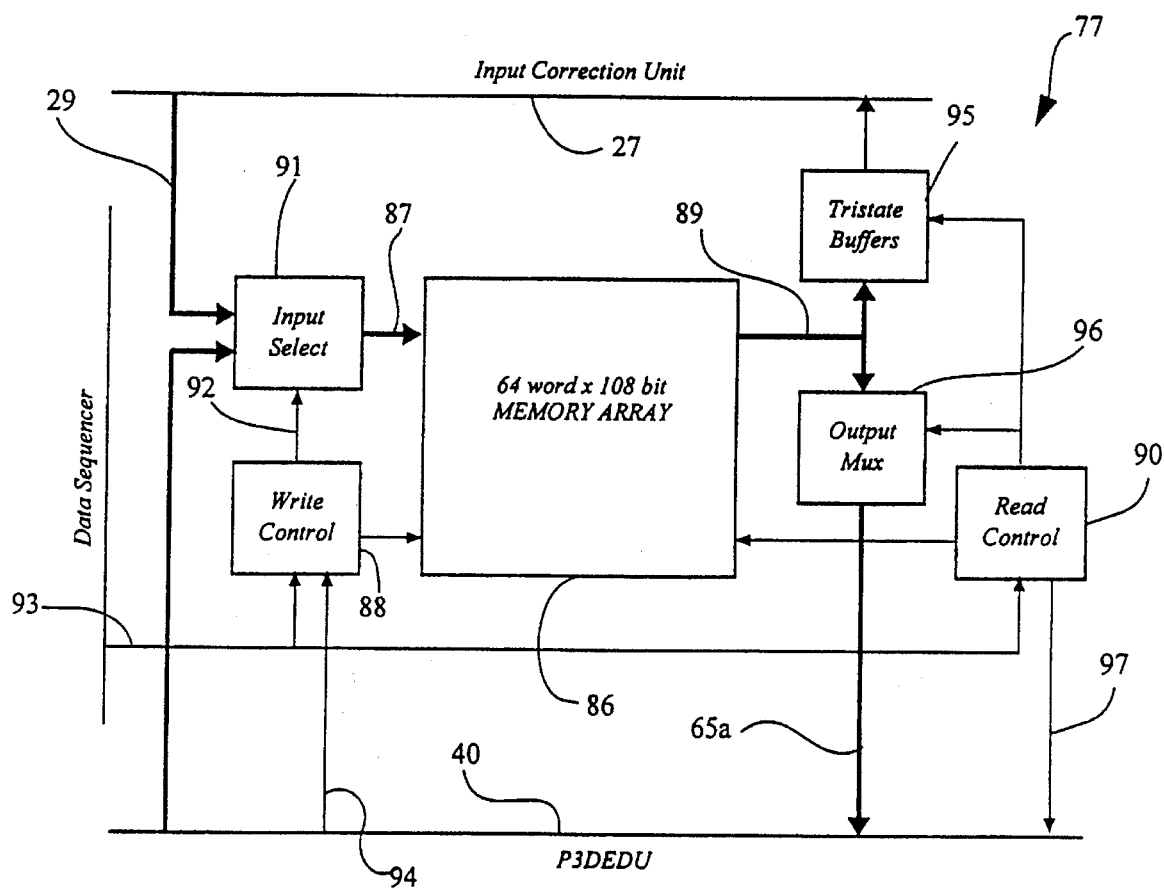
FIG. 18 is a schematic diagram representation of the 256×27-bit line store of FIG. 12.

Referring now to FIG. 18, there is shown the structure of the 256×27 bit RGB line store 77 in more detail. The 256×27 bit RGB line store 77 is part of the SEDB 66. It contains various address generation logic, so that it can be accessed as a FIFO in one of two modes: 108 bits read/write per cycle, or 27 bits read/write per cycle. In 108-bit mode, 256×27 bit RGB line store 77 reads and writes to the input correction unit 65. In 27-bit mode, the 256×27 bit RGB line store 77 reads and writes to the P3DEDU 78 in the same SEDB. Access in either mode is initiated by control signals from the data sequencer 72 (FIG. 11).

The 256×27 bit RGB line store 77 consists of a 64 word by 108 bit memory array 86 with separate read and write ports. The memory write port 87 can take data from either the input correction unit 65 or the relevant P3DEDU 78, and is controlled by a write control module 88. The data from the read data port 89 of the memory array 48 can be driven to either interface, under the control of a read control module 90.

An input select unit 91 is controlled by a signal 92 that chooses the source of the data. If the data is coming from the input correction unit 65 interface, it is passed straight through. If the data is coming from the P3DEDU interface, three consecutive samples are latched, and combined with the following sample to give 108 bits of write data, to be written once every fourth cycle.

The write control module 88 takes an EN_IC signal 93 from the data sequencer 72 (FIG. 11) and an P3DEDU_VALID signal 94 from the P3DEDU interface. When EN_IC is asserted, input correction unit 65 data is selected for writing, and one location in the memory array is written in each cycle. When P3PEDU_VALID is asserted, P3DEDU data is selected for writing, and one location is written every fourth cycle. When neither is asserted, no writes take place, and the write address is reset.

The 256×27 bit RGB line store 77 is provided with tristate buffers 95 which drive data from the memory array 86 outputs to the input correction unit 65. The tristate buffers 95 are enabled by the read control module 90 when the EN_IC signal 93 is asserted.

An output multiplexer 96 selects 27 bits from the memory array outputs to be driven to the P3DEDU interface. The four 27-bit groups that make up the array output are selected in rotation.

The read control module 90 takes an EN_IC and an EN_P3PEDU signal 93 from the data sequencer 72. When EN_IC is asserted, the tristate buffers are enabled, and the memory array 86 is read once each cycle. When EN_P3PEDU is asserted, the read control module 90 reads one location every fourth cycle, cycles the output multiplexer 96 and drives an IC_VALID signal 97 to the P3DEDU interface. When neither signal is asserted, no reads take place, and the read address is reset.

Referring now to FIG. 11 and FIG. 12, data to and from the P3DEDU 78 is in the form of three 9-bit values in each direction each clock cycle. Data to the P3DEDU 78 represents input-corrected components for each RGB pixel in the segment. Data from the P3DEDU 78 to the 256×27 bit RGB line store 77 represents error values to be diffused to the next line for each pixel.

Figure 19:
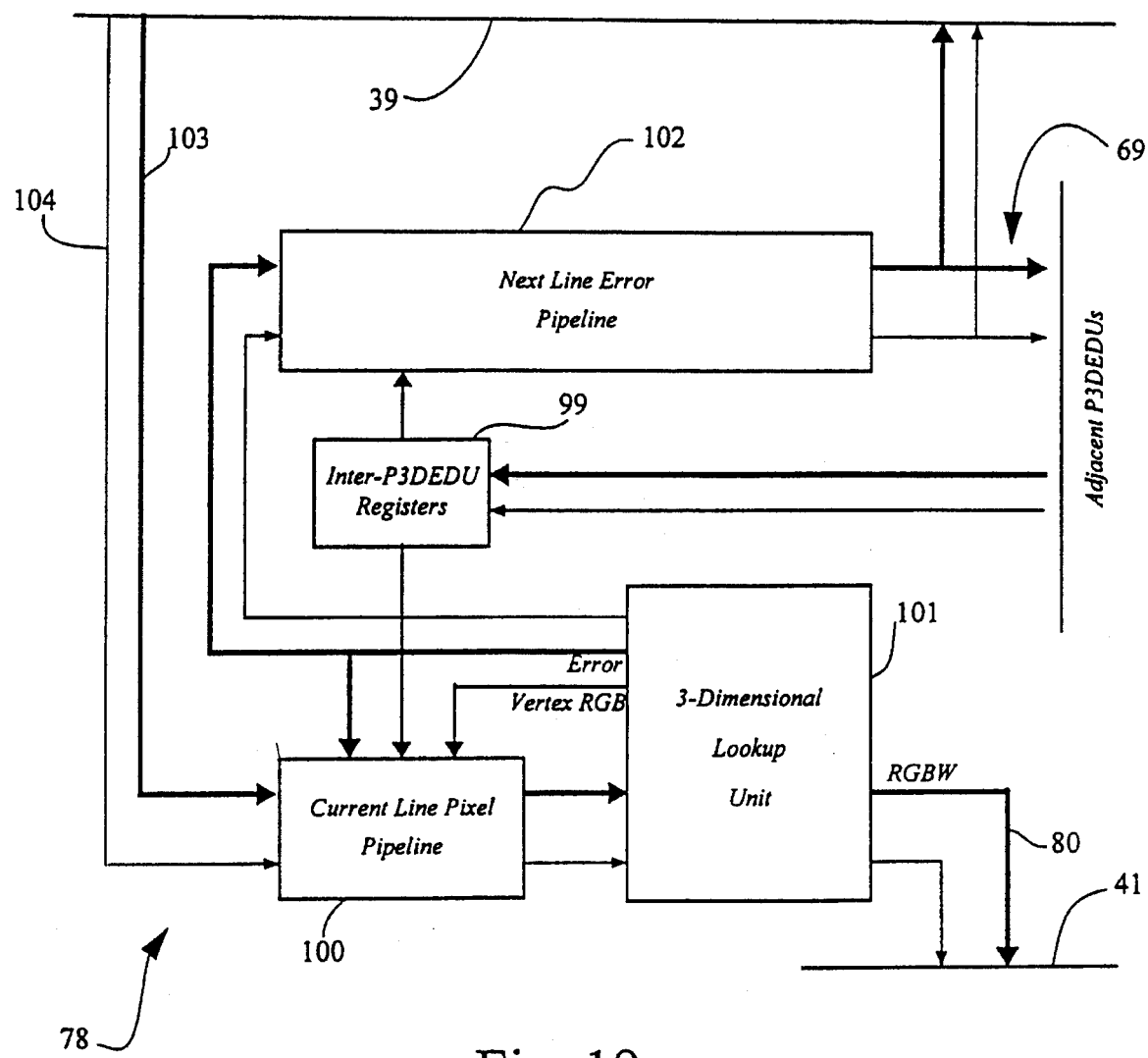
FIG. 19 is a schematic diagram representation of the parallel 3-dimensional error diffusion unit of FIG. 12.

Referring now to FIG. 19, there is shown the P3DEDU 78 in more detail. The P3DEDU 78 is made up of four main sections comprising Inter-P3DEDU Registers 99, a Current Line Pixel Pipeline (CLPP) 100, a 3-Dimensional Lookup Unit (3DLU) 101 and a Next Line Error Pipeline (NLEP) 102.

The input corrected data 103a comes from the 256×27 bit RGB line store 77, into the CLPP 100. The CLPP 100 generates the corrected values for pixels on the current line based on the incoming data, previous error results, and in some cases the contents of the Inter-P3DEDU Registers 99.

As each current line pixel value is calculated, it is passed to the 3-Dimensional Lookup Unit (3DLU) 63. The unit 63 looks up the RGBW vertex closest to the pixel value, finds the co-ordinates of this vertex in RGB space, and works out the error, which is the difference between the pixel value and the vertex RGB co-ordinates in accordance with the Heckbert process. This error value is latched and delayed by one cycle in the 3DLU 101. The RGBW output 80 of the vertex is output to the 256×4 bit RGBW line store 79, while the RGB value of the vertex, and the latched error, are fed back to the CLPP 100, to be used in the calculation of the next pixel value on the current line.

The Next Line Error Pipeline (NLEP) 102 receives the latched error from the 3DLU 101. The pipeline 64 calculates the error value to be passed to the next line in each pixel position, by doing a weighted sum of successive pixel errors; in some cases, values from the Inter-P3DEDU Registers 99 are used in this calculation. The results of the sum are driven to the 256×27 bit RGB line store 77 via line 65b, and also to the adjacent P3DEDU via line 31.

Control signals, (e.g. 104) pass through each unit with the data, so that at each interface, data is accompanied by a VALID signal, asserted whenever the data at that interface is valid. These control signals are used to generate local control signals within each module, and to generate output control signals at all interfaces.

Referring to FIG. 20, the Inter-P3DEDU Registers 99 are shown in more detail. For the sake of clarity, only the red channel data path is shown, with the blue and green data paths being identical. The Inter-P3DEDU Registers 99 form part of the P3DEDU 78. There are four Inter-P3DEDU Registers 99 for each colour, whose outputs (for the red channel) are designated R_IPP1, R_IPP0, R_IPN1, and R_IPN0. R_IPP0 and R_IPP1 represent Inter-P3DEDU errors from the previous segment, and are loaded in order from R_PREV when a PREV_VALID_IN signal is asserted. R_IPN0 and R_IPN1 represent Inter-P3DEDU errors from the next segment, and are loaded in order from R_NEXT when NEXT_VALID_IN is asserted.

Referring to FIG. 19, the P3DEDU 78 exchanges data from the two adjacent P3DEDUs through the SEDB to SEDB bus 69. Three 9-bit signals come from each of the adjacent P3DEDUs. In addition, the P3PEDU Error signals are driven to each adjacent P3DEDU. The data from the adjacent P3DEDUs represents P3PEDU errors diffusing into the current segment from adjacent segments. For each full segment processed by the P3DEDU 78, two values are received from the previous segment, and two from the next segment. Similarly, the P3PEDU Error outputs are used to transfer two samples to the previous segment, and two samples to the next segment.

In some cases the data from the Inter-P3DEDU Registers 99 is used by the CLPP 100 to calculate the next pixel value on the current line.

Referring to FIG. 21, there is shown the Current Line Pixel Pipeline (CLPP) 100 in more detail. Again, for clarity only the Red channel datapath is shown.

The CLPP 100 consists of a CLPP control unit 110, a three input P3DEDU adder 105, a two input P3DEDU substractor 106 a multiplexer 107 to select one of the adder inputs, and two latches 108, 109. Incoming pixel data R_IC is latched 108, and passed to the P3DEDU adder 105. The other inputs to the P3DEDU adder 105 are the latched CLPP output R_CLPP, and the output of the multiplexer 107 which selects between the 3DLU 101 error output R_3DLU, and the two Inter-P3DEDU Registers 99, R_IPP0 and R_IPP1 under the control of CLPP control unit 110. The adder result goes directly to the P3DEDU substractor 106, where the 3DLU 101 vertex selection output R_VER is subtracted from it.

R_3DLU represents the error diffused into the current pixel from the pixel two positions earlier. The error from the previous pixel is (R_CLPP-R_VER). The adder and subtractor combined to diffuse these two errors into the current pixel, while making the path from R_VER into the latch 109 be as fast as possible.

The multiplexer selection, and the reset signals on the latches, are controlled by CLPP control unit 110 signals derived from an IC_VALID input. These make sure that the CLPP 100 starts up correctly at the beginning of a line segment. In particular, R_CLPP is set to zero while the first pixel in the segment is being calculated, and this in turn forces R_VER to be zero. The CLPP control unit 110 also outputs CLPP_VALID, indicating valid data on the R_CLPP output.

The full algorithm for the CLPP 100 is:

```
Pixel 0:  R_SUM(0) = R_IC(0) + R_IPP0 + (2/8)*R_CLPP − (2/8)*R_VER
        = R_IC(0) + R_IPP0 since R_CLPP=R_VER=0
Pixel 1:  R_SUM(1) = R_IC(1) + R_IPP1 + (2/8)*R_CLPP − (2/8)*R_VER
Pixel n (1<n<N-1):R_SUM(n) = R_IC(n) + (1/8)*R_3DLU + (2/8)*R_CLPP − (2/8)
                *R_VER
```

Figure 22:
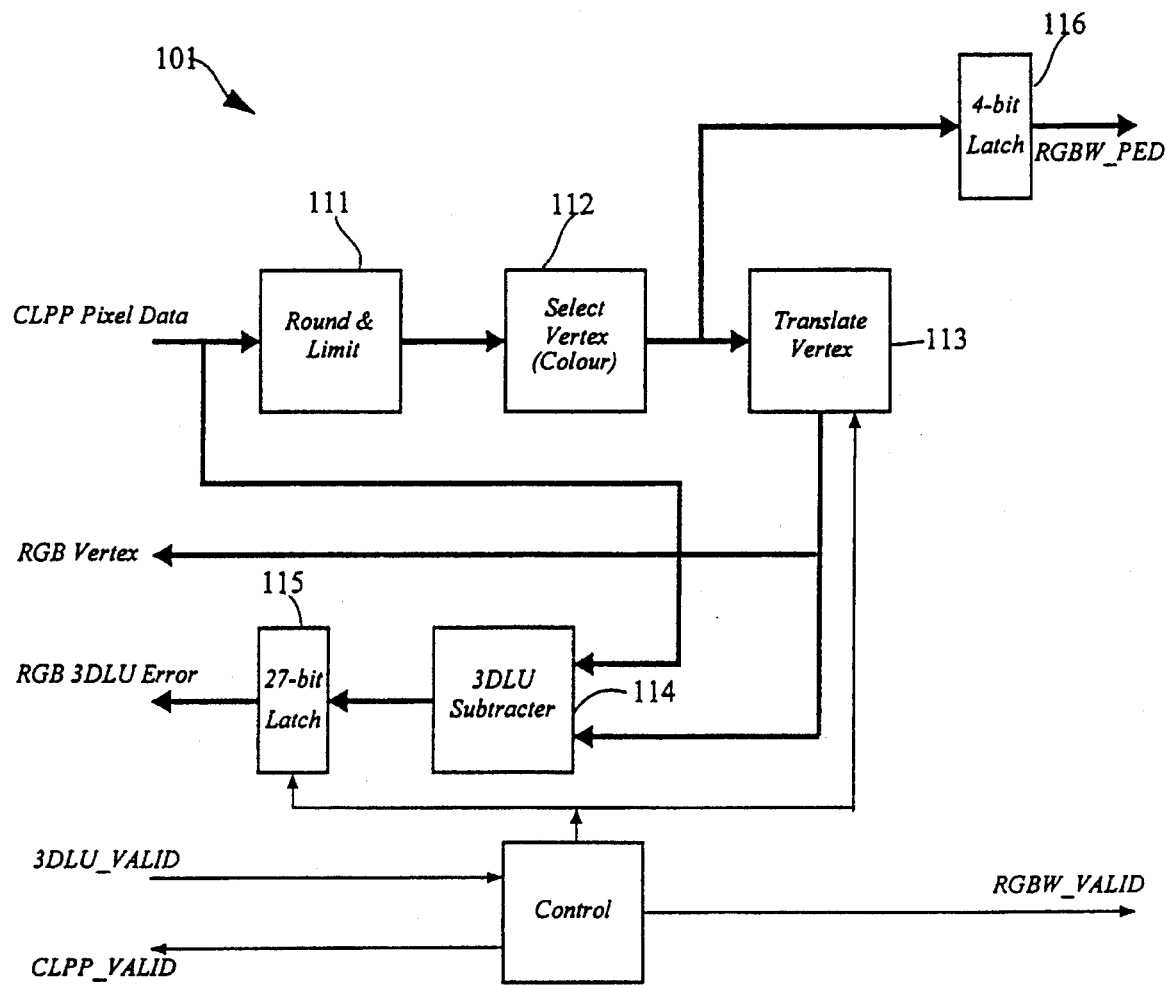
FIG. 22 is a schematic diagram of the 3-dimensional lookup unit of FIG. 19.

Referring now to FIG. 22, there is shown the 3-Dimensional Lookup Unit (3DLU) 63 in more detail. The 3DLU 101 receives each current line pixel as it is calculated by the CLPP 100. The 3DLU 101 takes the current line pixel as it is calculated and looks up the RGBW vertex closest to the pixel value. It then proceeds to find the co-ordinates of this vertex in RGB space. Next it works out the error.

The three components of the input pixel are reduced 111 to 3 bits each, by first limiting their values to between 0 and 255, then dividing by 32 and rounding the result. The resulting 9 bits are used to address a selection ROM 112, which selects one of the 16 RGBW values displayable on the FLCD panel. This selected vertex is driven out to the 256×4 bit RGBW line store 79 via latch 116.

The selected RGBW vertex is also translated back into RGB space by vertex translation unit 113, which uses six registers WPRed, RPRed, WPGreen, GPGreen, WPBlue, and BPBlue (not shown), which specify the co-ordinates of the RGBW vertices in RGB space. The RGB vertex resulting from this translation is driven out of the 3DLU 101. It is also subtracted from the incoming pixel value to give a 3DLU Error value, which is latched 115 before being output from the 3DLU 101. The 3DLU Error value and the RGB vertex value are fed back to the CLPP 100 which then calculates the next pixel value on the current line. 3DLU_VALID is asserted to indicate valid 3DLU 101 Error data.

Figure 23:
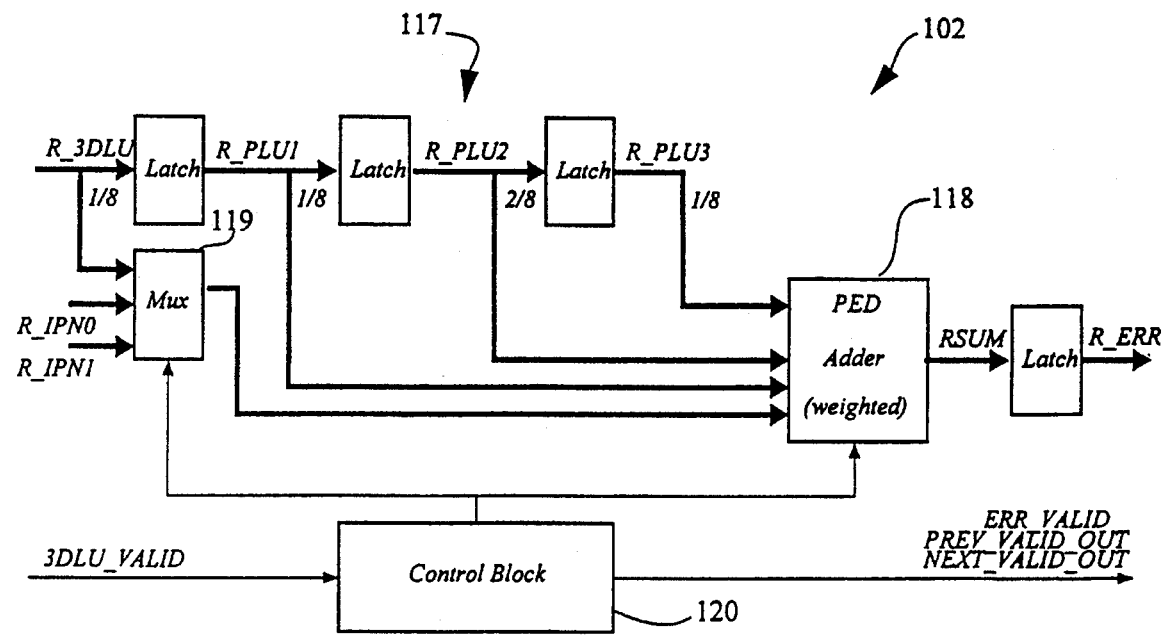
FIG. 23 is a schematic diagram of the next line error pipeline of FIG. 19.

Referring to FIG. 23, there is shown the Next Line Error Pipeline (NLEP) 102 in more detail. Again, for clarity only the Red channel datapaths are shown.

The NLEP 102 takes the calculated error for each pixel from the 3DLU 101 and generates the total error to be diffused into each pixel on the next line, as well as Inter-P3DEDU data. It consists of a pipeline 117 for error data from the 3DLU 101, a five-input adder 118, and a multiplexer 119 and control logic 120 to select the adder inputs.

The operation of the NLEP 102 is based on the input signal 3DLU_VALID, which is asserted by the 3DLU 101 when the first valid error is present on R_3DLU, and remains asserted until the last valid error for the segment. The data on R_3DLU is piped through three latches 117, so that at any time the four most recent error values from the 3DLU 101 are available. When not transferring valid error data from the 3DLU 101 (i.e. when 3DLU_VALID is not asserted), R_3DLU is always zero.

For the majority of its operation, the multiplexer 119 is selected so that adder 118 produces the following sum:

$$RSUM=(1/8)*R\_3DLU+(1/8)*R\_3DLU1+(2/8)*R\_3DLU2+(1/8)*R\_3DLU3$$

The first outputs produced by the NLEP 102 are the two error values to be sent to the previous segment. The first of these is produced when the first pixel error for the segment, R_3DLU(0), is on R_3DLU, and the second one clock cycle later. A PREV_VALID_OUT signal is asserted when these previous segment errors are on the output R_ERR, whose value will be:

```
Cycle −2   R_ERR = (1/8)*R_3DLU(0)   {other adder inputs are 0}
Cycle −1   R_ERR = (1/8)*R_3DLU(1) + (1/8)*R_3DLU(0){other adder inputs are 0}
```

In the following cycle, a ERR_VALID signal is asserted, and the errors for the current segment on the next line begin to appear on the output.

Cycle 0        R_ERR = (1/8)*R_3DLU(2) + (1/8)*R_3DLU(1) + (2/8)*R_3DLU(0)
Cycle K(1<n<,N-3) R_ERR = (1/8)*R_3DLU(n+2) + (1/8)*R_3DLU(n+1) + (2/8)*R_3DLU(n)
                              +(1/8)*R_3DLU(n-1)

In cycle N-2 the next line error for second last pixel in the segment is produced. A DATA_VALID signal will be deasserted because the are no more pixel errors to be transferred. In this cycle, the multiplexer 119 is switched to select the Inter-P3DEDU error register R_IPN1 (FIG. 20), which represents error to be diffused into pixel N-2 of the next line from the next segment.

Cycle N-2    R_ERR = R_IPN1 + (1/8)*R_3DLU(N-1) + (2/8)
                     *R_3DLU(N-2) +(1/8)*R_3DLU(N-3)

In the next cycle, the multiplexer 119 is switched to select the other Inter-P3DEDU error register R_IPN0. Zeroed errors from the 3DLU 101 are by now propagating down the pipeline.

Cycle N-1    R_ERR = R_IPN0 + 0 + (2/8)*R_3DLU(N-1) + (1/8) *R_3DLU(N-2)

Following cycle N-1, the ERR_VALID output is deasserted, and NEXT_VALID_OUT is asserted. At this stage the error pipeline is also temporarily stalled, with R_3DLU2 holding R_3DLU(N-1), and R_3DLU3 holding R_3DLU(N-2). The final two outputs are the errors to be diffused into the next segment, which are:

Cycle N      R_ERR = (2/8)*R_3DLU(N-1) + (1/8)*R_3DLU(N-2)
Cycle N + 1  R_ERR = (2/8)*R_3DLU(N-1)

The NLEP 102 drives the accumulated errors to be propagated into each pixel position on the next line to the 256×27 bit RGB line store 77, and the errors to be propagated into adjacent segments on the next line to other P3DEDUs.

Figure 24:
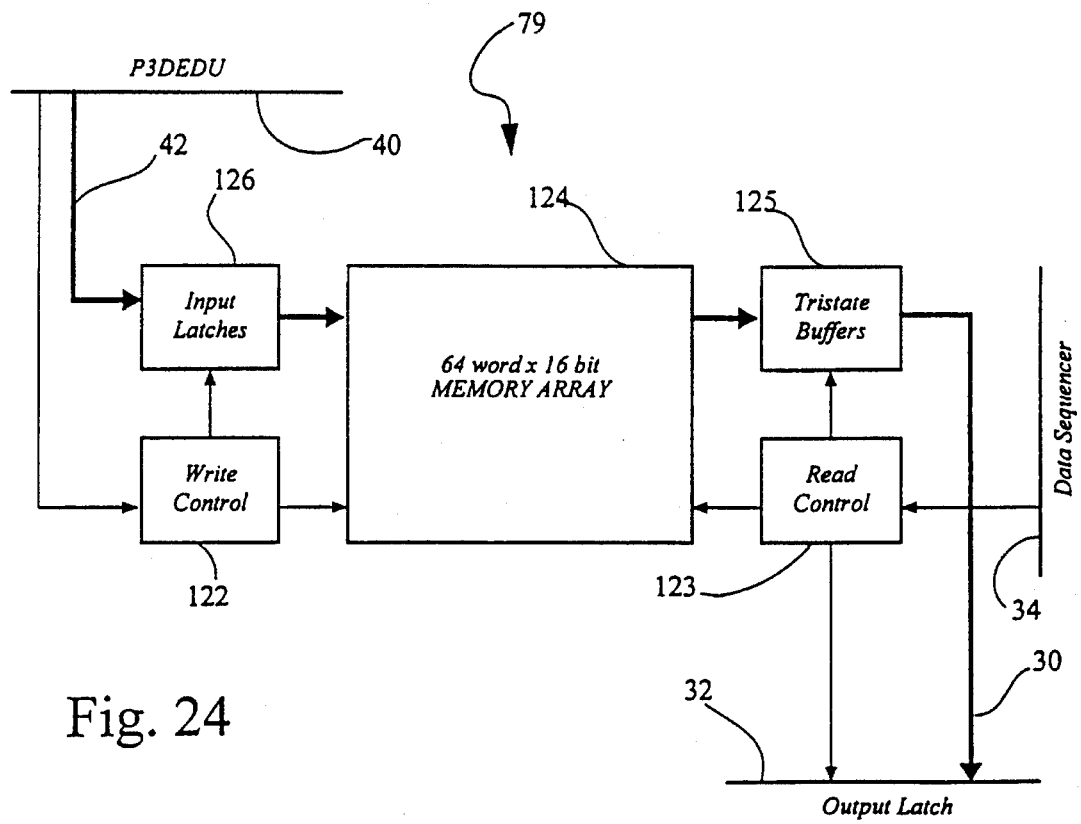
FIG. 24 is a schematic diagram of the 256×4 bit line store of FIG. 19.

Referring to FIG. 24, there is shown the 256×4 bit RGBW line store 79 in more detail. As shown in FIG. 13, the 256×4 bit RGBW line store 79 forms part of a SEDB 66 and is interfaced to the data sequencer 72, the P3DEDU 78 and the output latch 70. It contains write control logic 122 and read control logic 123, so that it can be accessed as a FIFO in one of two modes: 4 bits written in each cycle, or 16 bits read in each cycle. In 4-bit write mode, the 256×4 bit RGBW line store 79 is written by the P3DEDU 78 in the same SEDB. In 16-bit read mode, the 256×4 bit RGBW line store 79 is read by the output latch 70. Access in one or other mode is initiated by control signals from the data sequencer 72 and the P3DEDU 78.

The 256×4 bit RGBW line store 79 consists of a 64 word by 16 bit memory array 124, with separate read and write ports. The memory write port takes data from the P3DEDU interface, and is controlled by the write control logic 122. The read port data is driven to the interface of the output latch 70 via tri-state buffers 125, under the control of the read control logic 123.

The input latch 126 assembles 4-bit data from the P3DEDU 78 into 16-bit words for writing to the memory array. Three consecutive samples are latched, and combined with the following sample to give 16 bits of write data which is written to the memory array 124 once every fourth cycle.

The write control logic 122 takes the P3PEDU_VALID signal, and generates input latch control signals, and memory array write controls, so that one array location is written every fourth cycle while P3PEDU_VALID is asserted. When it is deasserted, no writes take place, and the write address is reset.

The tri-state buffers 125 drive data from the memory array outputs onto the output latch interface. They are enabled by the read control logic 123 when EN_READ is asserted.

The tri-state buffers 125 take a EN_READ signal from the data sequencer 72. When it is asserted, the tri-state buffers 125 are enabled, and the memory array 124 is read once each cycle. When it is deasserted, no reads take place, and the read address is reset. A control signal from the data sequencer 72 initiates the 256×4 bit RGBW line store 79 operation in its read mode.

Figure 25:
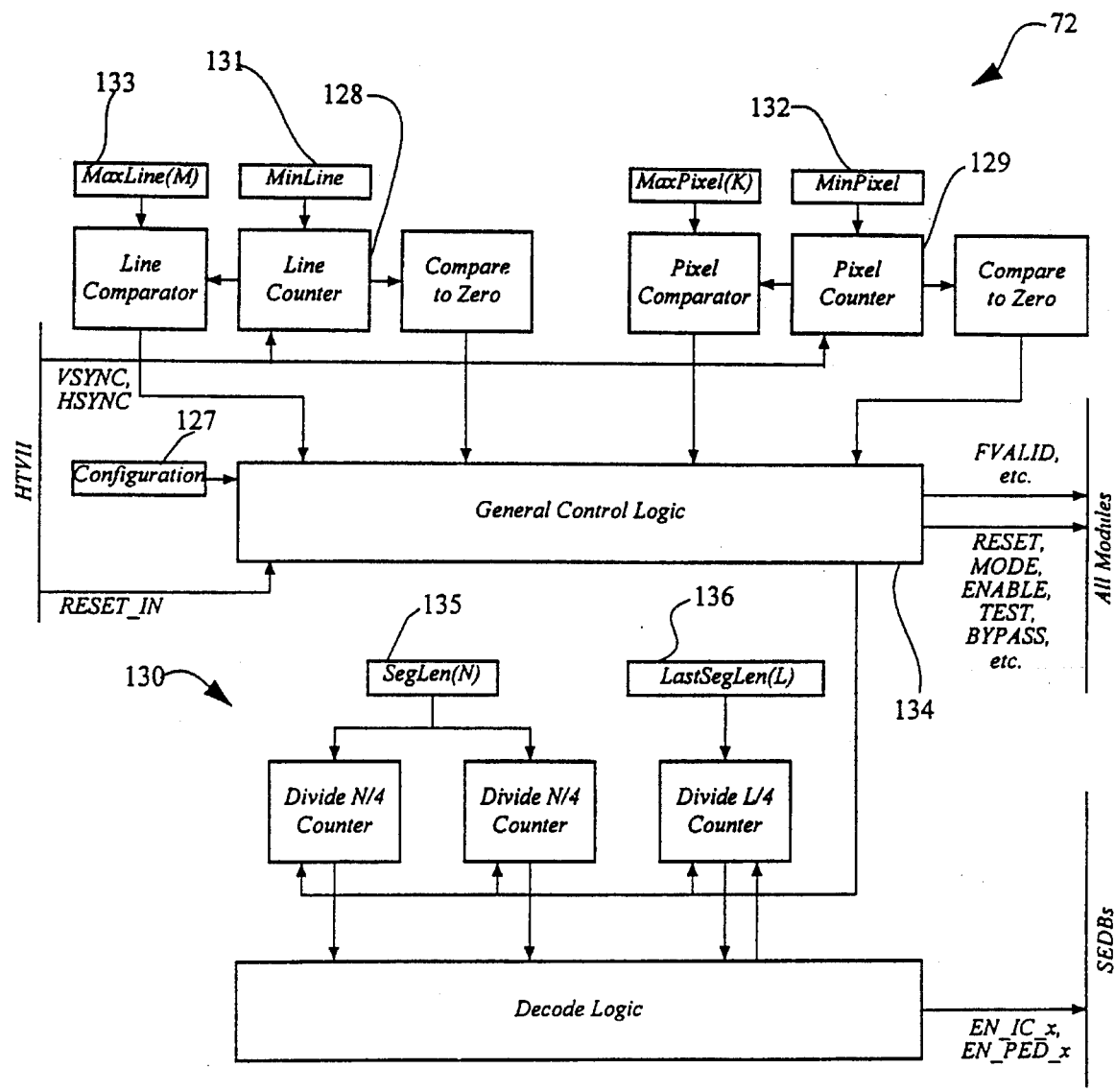
FIG. 25 is a schematic diagram of the data sequencer of FIG. 11.

Referring to FIG. 25, there is shown in detail the data sequencer 72. The data sequencer 72 controls the operation of all other modules on the block parallel error diffusion apparatus 62. It contains configuration registers 127, which control the operating modes of the other modules on a global basis. It also contains line counter 128, pixel counter 129 and segment counters 130, which are used to control the sequencing of the other modules, particularly the SEDBs.

The data sequencer 72's operation for a frame is started when an active edge is detected on a VSYNC input signal to the block parallel error diffusion apparatus 62. This causes the line counter 128 to be loaded from a minline register 131. The line counter 128 is incremented on the occurrence of every HSYNC active edge, also input to the block parallel error diffusion apparatus 62. The HSYNC active edge also causes the pixel counter 129 to be loaded from a minpixel register 132. The pixel counter 129 is incremented by 4 in every PCLK cycle.

The line counter 128 is compared against zero, and against a maxline register 133, to determine whether the block parallel error diffusion apparatus 62 is in the active part of each line. The results of these comparisons are fed to a general logic block 134, along with the contents of the configuration registers 127. This general logic block 134 produces the global reset, enable and test signals to the rest of the modules on the block parallel error diffusion apparatus 62. It also controls the function of the rest of the data sequencer 72, which generates the SEDB sequencing signals.

The SEDB segment counters 130 consists mainly of three counters. There are two counters which divide the clock by N/4 cycles, where N is the value in a segment length register 135. The counters are used on alternate lines to produce the control signals for the first four SEDBs. The third counter divides the clock by L/4 cycles, where L is the value in a last segment length register 136. This counter is used in each cycle to produce the control signals for SEDB4.

Figure 26:
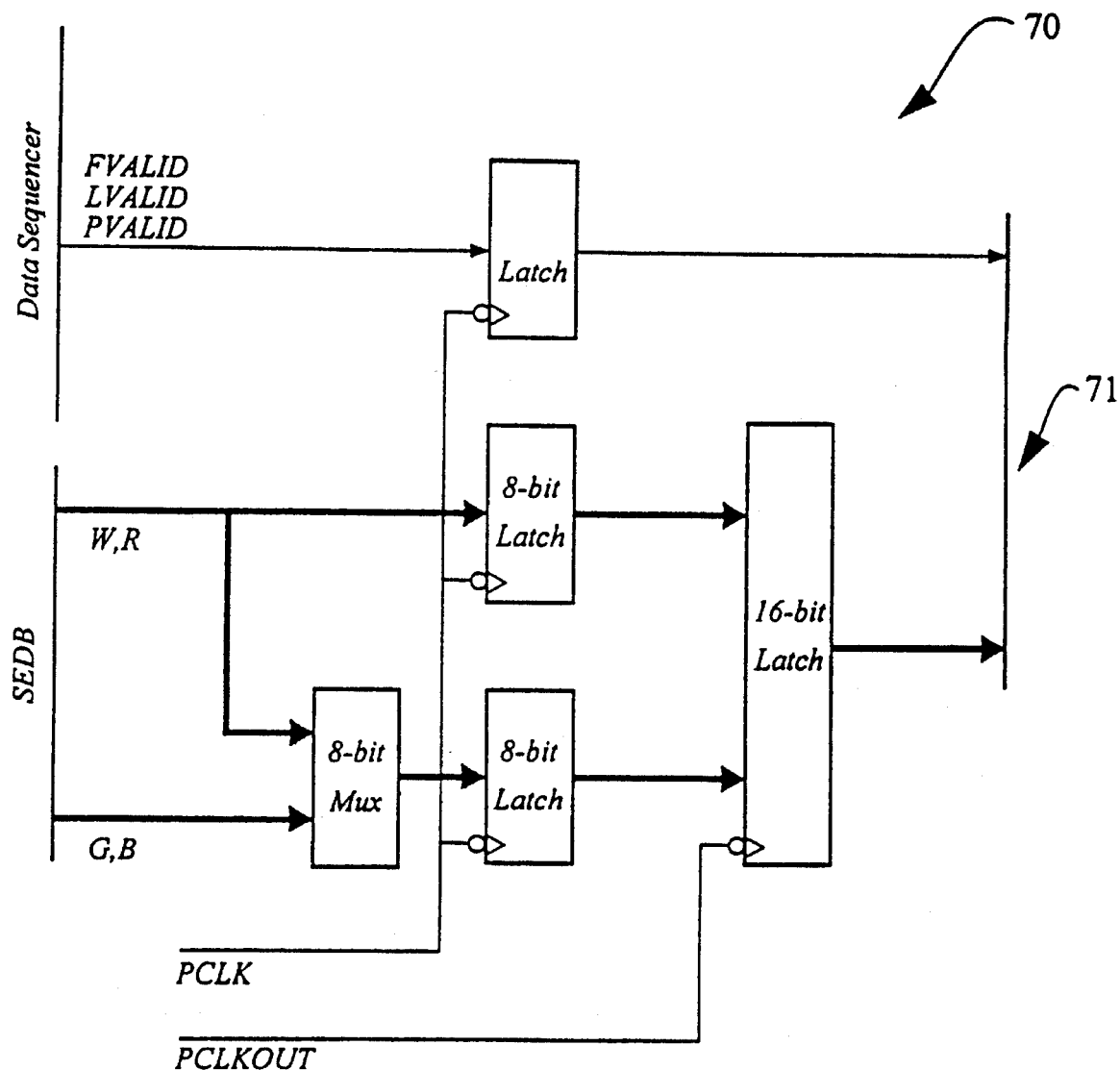
FIG. 26 is a schematic diagram of the output latch of FIG. 11.

Referring now to FIG. 26, there is shown the output latch 70, which takes data from the SEDB, and formats it before driving it to the output data bus 71. In the colour case, this simply delays data by one cycle. The output latch 70 also latches the frame, line and pixel valid output signals, so that they remain in step with the output data.

Data from the SEDB is in the form of four 4-bit values in each clock cycle, and represents RGBW or monochrome values for four consecutive pixels.

The output latch 70 is essentially two banks of flipflops. The first bank is clocked by the falling edge of PCLK. The Valid signals are latched in each cycle. The 16 bits from the SEDB are also latched each cycle in the first bank. The second bank of latches is clocked by the rising edge of PCLKOUT, and drives the output.

From the forgoing description it can be seen a method and apparatus for overcoming the high speed processing requirements through the use of parallelism has been described. The segmentation of the process and the alteration across boundaries has been found to produce minimal, if any, distortions and can sometimes lead to an improvement in error diffused image quality.

The foregoing description shows only the preferred embodiment of the present invention. Variations of the present invention, obvious to those skilled in the art, can be made thereto without parting from the scope of the invention. For example, the present invention can be applied to many different colour models without significant changes and the number of segments can be increased with a corresponding reduction in processing speeds.

We claim:

1. A method for error diffusion of image data, said method comprising the steps of:

inputting a plurality of lines of input data corresponding to part of a current input image;

dividing said plurality of lines into a plurality of areas arranged sequentially along said lines, each of said areas spanning said plurality of lines and including a plurality of pixels:

selecting a current line from said plurality of lines, and from said current line selecting a current pixel from each said area;

simultaneously error diffusing a current pixel value of each of said selected current pixels to produce a corresponding output pixel value and an associated pixel error value; and adding the associated pixel error value to the pixel value of neighbouring pixels in the area corresponding to the current selected pixel or to pixels in an area of a non-current line.

2. A method as claimed in claim 1, wherein the dividing step further comprises:

identifying edge regions of each of said areas adjacent other said areas, and removing complementary non-adjacent regions from said other areas; and said adding step further includes adding portions of the associated pixel error for pixels in said edge regions of each said area to non-current line pixels of edge regions of said other areas.

3. A method as claimed in claim 2, wherein the associated error for edge region pixels is added to the next line of pixels of an adjacent area.

4. A method as claimed in claim 1, wherein the dividing step includes assigning a predetermined portion of each input image line to the same area.

5. A method as claimed in claim 1, wherein the adding step is carried out using Floyd-Steinberg coefficients.

6. A method as claimed in claim 1, wherein the input data includes separate channels of information for red, green and blue colour data.

7. An error diffusion apparatus comprising:

image input means adapted to input image data to be displayed;

input storage means for storing a predetermined plurality of lines of said image data received from said image input means, the stored image data being divisible into a plurality of sequentially arranged areas disposed over said predetermined plurality of lines; and a plurality of error diffusion units each corresponding to one of said areas, each said error diffusion unit including:

(i) pixel input means, connected to said input storage means, for receiving input pixels derived from a corresponding one of said areas and from a current line of said predetermined plurality of lines;

(ii) error diffusion means for error diffusing each of said input pixels to produce corresponding output pixels and error diffusion data; and (iii) error spreader means for adding said error diffusion data firstly to pixels adjacent to said input pixel within the corresponding area and secondly to pixels in adjacent areas of a non-current line of said predetermined plurality of lines, wherein said error diffusion units are configured to operate simultaneously.

8. An error diffusion apparatus as claimed in claim 7, further comprising pixel output means for outputing said output pixels to an output storage means, said output storage means being adapted to receive said output pixels from said error diffusion means to store said output pixels for display.

9. An error diffusion apparatus as claimed in claim 7, wherein the non-current line of said adjacent areas is a next line of said predetermined plurality of lines.

10. A error diffusion apparatus as claimed in claim 7, wherein the input image consists of a plurality of lines of data exceeding said predetermined plurality of lines and each said area is allocated to a corresponding portion of any input line.

11. An error diffusion apparatus for error diffusing an input image consisting of a plurality of lines of pixels, said apparatus comprising:

input correction means adapted to receive said input image on a line by line basis and to add to each pixel of a current line, error diffusion fragments derived from surrounding pixels of said current line; and a plurality of error diffusion means configured to operate substantially independently and in parallel, each on a different area of said current line to provide said error diffusion fragments and to interchange error diffusion data for pixels located at edges of each said area.

12. An error diffusion apparatus as claimed in claim 11, wherein said input correction means adds to each said pixel, error diffusion fragments obtained from at least one line preceding said current line.

* * * * *

UNITED STATES PATENT AND TRADEMARK OFFICE
CERTIFICATE OF CORRECTION

PATENT NO. : 5,519,791  
DATED : May 21, 1996  
INVENTOR(S) : Webb et al.

Page 1 of 2

It is certified that error appears in the above-indentified patent and that said Letters Patent is hereby corrected as shown below:

COLUMN 1:

Line 44, "cogon" should read --common--.

COLUMN 2:

Line 53, "3, one eighths" should read --3, and one eighth--.

COLUMN 3:

Line 65, "In" should read --in--.

COLUMN 9:

Line 39, "line m" should read --line (m)--.  
Line 51, "line m" should read --line (m)--.

COLUMN 10:

Line 65, "if(a(8)=0" should read --if (a(8)=0--.  
Line 66, "if(c_out=1)" should read --if (c_out=1)--.

COLUMN 11:

Line 1, "if(a(8)=1" should read --if (a(8)=1--.  
Line 2, "if(c(8)=0" should read --if (c(8)=0--.

COLUMN 14:

Line 61, "$(1/8)^*R_{-3DLU(0)}$ {other adder inputs are 0}" should read --$(1/8)^*R\text{-}3DLU(0)$ {other adder inputs are 0}--.  
Line 62, "$(1/8)^*R_{-3DLU(1)} + (1/8)^*R\_3DLU(0)$" should read --$(1/8)^*R\text{-}3DLU(1) + (1/8)^*R\_3DLU(0)$--.

UNITED STATES PATENT AND TRADEMARK OFFICE
CERTIFICATE OF CORRECTION

PATENT NO.   : 5,519,791
DATED        : May 21, 1996
INVENTOR(S)  : Webb et al.

It is certified that error appears in the above-indentified patent and that said Letters Patent is hereby corrected as shown below:

COLUMN 15:

Line 2, "Cycle K(1<n<,N-3)" should read --Cycle K(1<n<N-3)--.
Line 7, "for second last" should read --for the second to last--.
Line 26, "R IPNO" should read --R_IPNO--.

Signed and Sealed this

Third Day of December, 1996

Attest:

BRUCE LEHMAN

*Attesting Officer*    *Commissioner of Patents and Trademarks*